United States Patent
Akatsuka et al.

(10) Patent No.: US 11,962,959 B2
(45) Date of Patent: Apr. 16, 2024

(54) INFORMATION PROCESSING SYSTEM, GATEWAY, SERVER, AND INFORMATION PROCESSING METHOD

(71) Applicant: SINTOKOGIO, LTD., Nagoya (JP)

(72) Inventors: Narihiro Akatsuka, Nagoya (JP); Naohisa Nakamura, Nagoya (JP)

(73) Assignee: SINTOKOGIO, LTD., Aichi (JP)

(*) Notice: Subject to any disclaimer, the term of this patent is extended or adjusted under 35 U.S.C. 154(b) by 0 days.

(21) Appl. No.: 17/607,930

(22) PCT Filed: Feb. 7, 2020

(86) PCT No.: PCT/JP2020/004720
§ 371 (c)(1),
(2) Date: Nov. 1, 2021

(87) PCT Pub. No.: WO2020/240937
PCT Pub. Date: Dec. 3, 2020

(65) Prior Publication Data
US 2022/0321980 A1 Oct. 6, 2022

(30) Foreign Application Priority Data

May 29, 2019 (JP) ................. 2019-100605

(51) Int. Cl.
*H04Q 9/02* (2006.01)
*G08B 21/18* (2006.01)
(52) U.S. Cl.
CPC .............. *H04Q 9/02* (2013.01); *G08B 21/18* (2013.01); *H04Q 2209/10* (2013.01); *H04Q 2209/82* (2013.01); *H04Q 2209/84* (2013.01)
(58) Field of Classification Search
CPC ........ H04Q 9/00; H04Q 9/02; H04Q 2209/00; H04Q 2209/10; H04Q 2209/40;
(Continued)

(56) References Cited

U.S. PATENT DOCUMENTS 7,181,654 B2 2/2007 Ford, Jr. et al.
7,197,461 B1 3/2007 Eberle et al.
(Continued)

FOREIGN PATENT DOCUMENTS

CN 101031145 A 9/2007
CN 102004984 A 4/2011
(Continued)

OTHER PUBLICATIONS

U.S. Appl. No. 17/605,618, filed Oct. 22, 2021.
(Continued)

*Primary Examiner* — Franklin D Balseca
(74) *Attorney, Agent, or Firm* — Harness, Dickey & Pierce, P.L.C.

(57) ABSTRACT

Equipment in a production facility is managed with use of information from the equipment and information from a sensor for measurement of a state of the equipment, while achieving a high degree of freedom in increasing and decreasing the number of such sensors.

The present invention is provided with a gateway (10) and a server (20). The gateway is connected to a controller included in each piece of equipment and connected, without being intermediated by the controller, to an externally attached sensor accompanying the each piece of equipment. The server is connected to the gateway. The gateway carries out the processes of: receiving, from each controller, information indicative of an internal state of the piece of equipment; receiving, from each sensor, information indicative of an external state of the piece of equipment; and transmitting these pieces of information to the server. The server carries out a process of combining and outputting the information indicative of the internal state and the information indicative of the external state received from the gateway.

6 Claims, 24 Drawing Sheets

(58) Field of Classification Search
CPC ........... H04Q 2209/43; H04Q 2209/70; H04Q 2209/80; H04Q 2209/82; H04Q 2209/826; H04Q 2209/84; G08B 21/18
See application file for complete search history.

(56) References Cited

U.S. PATENT DOCUMENTS

| | | | |
|---|---|---|---|
| 7,920,983 | B1 | 4/2011 | Peleg et al. |
| 8,935,368 | B2* | 1/2015 | Calo .................. H04L 9/40 709/220 |
| 9,716,926 | B2* | 7/2017 | Johnson .................. H04Q 9/00 |
| 10,782,675 | B2* | 9/2020 | Mangino ............ G05B 23/0235 |
| 2002/0091971 | A1 | 7/2002 | Sawada et al. |
| 2003/0160691 | A1 | 8/2003 | Robbins et al. |
| 2005/0007249 | A1 | 1/2005 | Eryurek et al. |
| 2008/0262795 | A1 | 10/2008 | Webb et al. |
| 2010/0141421 | A1 | 6/2010 | Lagnelov et al. |
| 2011/0055007 | A1 | 3/2011 | Kitagawa et al. |
| 2011/0227744 | A1 | 9/2011 | Shibata et al. |
| 2011/0264424 | A1 | 10/2011 | Miwa et al. |
| 2015/0120083 | A1 | 4/2015 | Gurovich et al. |
| 2015/0247783 | A1 | 9/2015 | Kondo et al. |
| 2016/0274558 | A1 | 9/2016 | Strohmenger et al. |
| 2017/0200240 | A1 | 7/2017 | Marinelli et al. |
| 2018/0052452 | A1 | 2/2018 | Kimura |
| 2018/0077062 | A1 | 3/2018 | Park et al. |
| 2018/0122133 | A1 | 5/2018 | Narayan et al. |
| 2018/0164764 | A1* | 6/2018 | Weatherbee ......... G05B 19/042 |
| 2018/0232294 | A1 | 8/2018 | Oyama et al. |
| 2018/0284741 | A1 | 10/2018 | Cella et al. |
| 2018/0356804 | A1 | 12/2018 | Oka et al. |
| 2019/0042167 | A1 | 2/2019 | Yamada |
| 2019/0095147 | A1 | 3/2019 | Yano et al. |
| 2019/0363932 | A1 | 11/2019 | Nasu et al. |
| 2020/0081069 | A1 | 3/2020 | Chen et al. |
| 2022/0060805 | A1* | 2/2022 | Zistler ..................... H04Q 9/00 |
| 2022/0230526 | A1 | 7/2022 | Akatsuka et al. |

FOREIGN PATENT DOCUMENTS

| | | |
|---|---|---|
| CN | 102216534 A | 10/2011 |
| CN | 102822838 A | 12/2012 |
| CN | 105492165 A | 4/2016 |
| CN | 107817779 A | 3/2018 |
| CN | 108804281 A | 11/2018 |
| CN | 109102669 A | 12/2018 |
| CN | 109388353 A | 2/2019 |
| CN | 109582252 A | 4/2019 |
| EP | 1819184 A1 | 8/2007 |
| EP | 2259629 A1 | 12/2010 |
| JP | 4-15710 | 1/1992 |
| JP | 2004-84573 | 3/2004 |
| JP | 2004-532449 | 10/2004 |
| JP | 2004-326468 | 11/2004 |
| JP | 2007-87117 | 4/2007 |
| JP | 2007-266393 | 10/2007 |
| JP | 2010-122847 | 6/2010 |
| JP | 2013-257459 A | 12/2013 |
| JP | 2014-59802 | 4/2014 |
| JP | 6138066 B2 | 5/2017 |
| JP | 2018-32396 | 3/2018 |
| JP | 2018-63715 | 4/2018 |
| JP | 2018-97512 | 6/2018 |
| JP | 2018-149597 | 9/2018 |
| JP | 2019-74059 | 5/2019 |
| WO | WO-02/071171 | 9/2002 |
| WO | 104463550 A | 3/2015 |
| WO | WO-2017/056749 | 4/2017 |
| WO | WO-2017/104401 | 6/2017 |
| WO | WO-2019/087409 | 5/2019 |

OTHER PUBLICATIONS

International Search Report and English translation thereof for PCT/JP2020/004796 dated Apr. 14, 2020.
International Preliminary Report on Patentability and English translation thereof for PCT/JP2020/004796 dated Apr. 14, 2020.
International Search Report and English translation thereof for PCT/JP2020/004720 dated Apr. 14, 2020.
International Preliminary Report on Patentability and English translation thereof for PCT/JP2020/004720 dated Apr. 14, 2020.
Extended European Search Report for EP 20814569.8 dated May 25, 2023.
U.S. Office Action for corresponding U.S. Appl. No. 17/605,618 dated Jan. 6, 2023.
Indian Office Action for Application No. 202147051208 dated Feb. 10, 2023.
Extended European Search Report for EP Application No. 20812879.3 dated May 8, 2023.
Japanese Office Action and English translation thereof for JP Application No. 2021-522633 dated May 9, 2023.
Japanese Office Action for Japanese Patent Application No. 2021-522633 and English translation thereof dated Oct. 17, 2023.
Chinese Office Action for Chinese Patent Application No. 202080038932.9 issued on Feb. 20, 2024.
Chinese Office Action for Chinese Patent Application No. 202080039080.5 issued on Feb. 23, 2024.

* cited by examiner

| EQUIPMENT NAME | CONTROLLER | | COMPONENT NAME | RELEVANT FILE 1 | RELEVANT FILE 2 |
|---|---|---|---|---|---|
| | NETWORK ADDRESS | CONNECTION PROTOCOL | | | |
| PIECE OF EQUIPMENT M1 | ADDRESS 1 | PROTOCOL A | COMPONENT A, COMPONENT B | MANUAL A | APPEARANCE IMAGE A |
| PIECE OF EQUIPMENT M2 | ADDRESS 2 | PROTOCOL B | COMPONENT C, COMPONENT D | MANUAL B | APPEARANCE IMAGE B |
| : | | | | | |

(b)

| SENSOR NAME | SENSOR BASE UNIT | |
|---|---|---|
| | NETWORK ADDRESS | CONNECTION PROTOCOL |
| SENSOR C1 | ADDRESS 10 | PROTOCOL C |
| SENSOR C2 | ADDRESS 10 | PROTOCOL C |
| : | | |

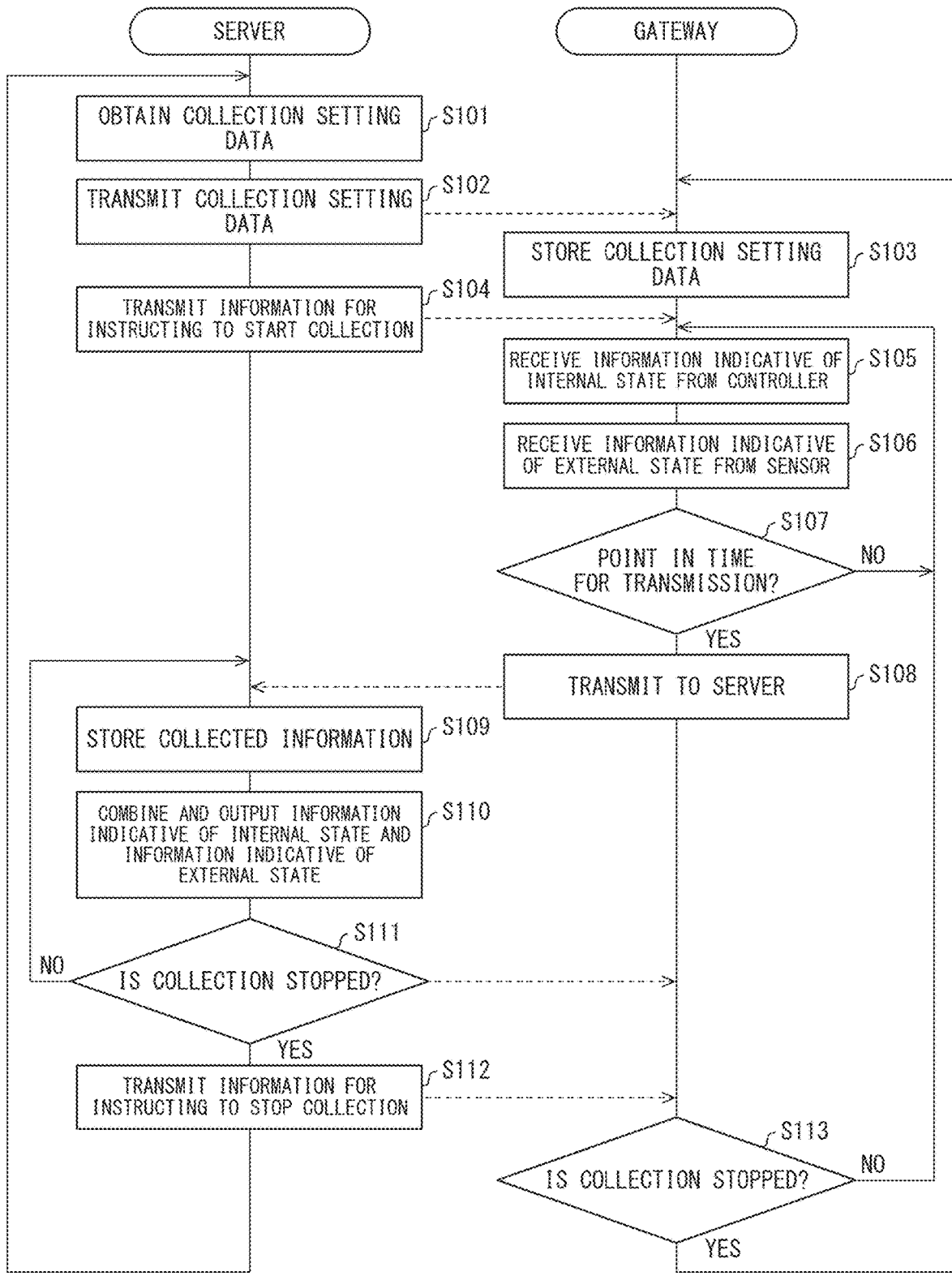

SETTING RELATED TO COLLECTION OF INFORMATION FROM CONTROLLER

EQUIPMENT NAME _____ G101

TAG NAME _____ G102

DEVICE NAME _____ G103

UNIT CONVERSION _____ G104

UNIT _____ G105

COLLECTION CYCLE _____ G106

[RETURN] G111  [REGISTER] G112

G1

(b)

| EQUIPMENT NAME | TAG NAME | DEVICE NAME | UNIT | UNIT CONVERSION | COLLECTION CYCLE |
|---|---|---|---|---|---|
| PIECE OF EQUIPMENT M1 | TAG T11 | DATA REGISTER D01 | UNIT 1 | FORMULA 1 | 30 SECONDS |
| PIECE OF EQUIPMENT M1 | TAG T12 | LATCH RELAY L01 | UNIT 2 | FORMULA 2 | 60 SECONDS |
| PIECE OF EQUIPMENT M2 | TAG T13 | DATA REGISTER D11 | UNIT 3 | FORMULA 3 | 60 SECONDS |
| PIECE OF EQUIPMENT M2 | TAG T14 | DATA REGISTER D15 | UNIT 4 | FORMULA 4 | 1 SECOND |
| : | : | : | : | : | : |

SETTING RELATED TO COLLECTION OF INFORMATION FROM SENSOR

- EQUIPMENT NAME _____ G201
- TAG NAME _____ G202
- SENSOR NAME _____ G203
- UNIT CONVERSION ___ G204
- UNIT ___ G205
- COLLECTION CYCLE ___ G206

[RETURN] G211  [REGISTER] G212

(b)

| EQUIPMENT NAME | TAG NAME | SENSOR NAME | UNIT | UNIT CONVERSION | COLLECTION CYCLE |
|---|---|---|---|---|---|
| PIECE OF EQUIPMENT M1 | TAG T21 | SENSOR C1 | UNIT 4 | FORMULA 4 | 1 SECOND |
| PIECE OF EQUIPMENT M1 | TAG T22 | SENSOR C2 | UNIT 5 | FORMULA 5 | 30 SECONDS |
| PIECE OF EQUIPMENT M2 | TAG T23 | SENSOR C3 | UNIT 6 | FORMULA 6 | 60 SECONDS |
| : | : | : | : | : | : |

FIG. 9

| TAG NAME | NETWORK ADDRESS | DEVICE NAME | SENSOR NAME | CONNECTION PROTOCOL | UNIT CONVERSION | COLLECTION CYCLE |
|---|---|---|---|---|---|---|
| TAG T11 | ADDRESS 1 | DATA REGISTER D01 | – | PROTOCOL A | FORMULA 1 | 30 SECONDS |
| TAG T12 | ADDRESS 1 | LATCH RELAY L01 | – | PROTOCOL A | FORMULA 2 | 60 SECONDS |
| TAG T13 | ADDRESS 2 | DATA REGISTER D11 | – | PROTOCOL B | FORMULA 3 | 60 SECONDS |
| TAG T14 | ADDRESS 2 | DATA REGISTER D15 | – | PROTOCOL B | FORMULA 4 | 1 SECOND |
| TAG T21 | ADDRESS 10 | – | SENSOR C1 | PROTOCOL C | FORMULA 4 | 1 SECOND |
| TAG T22 | ADDRESS 10 | – | SENSOR C2 | PROTOCOL C | FORMULA 5 | 30 SECONDS |
| TAG T23 | ADDRESS 10 | – | SENSOR C3 | PROTOCOL C | FORMULA 6 | 60 SECONDS |
| ⋮ | ⋮ | ⋮ | ⋮ | ⋮ | ⋮ | ⋮ |

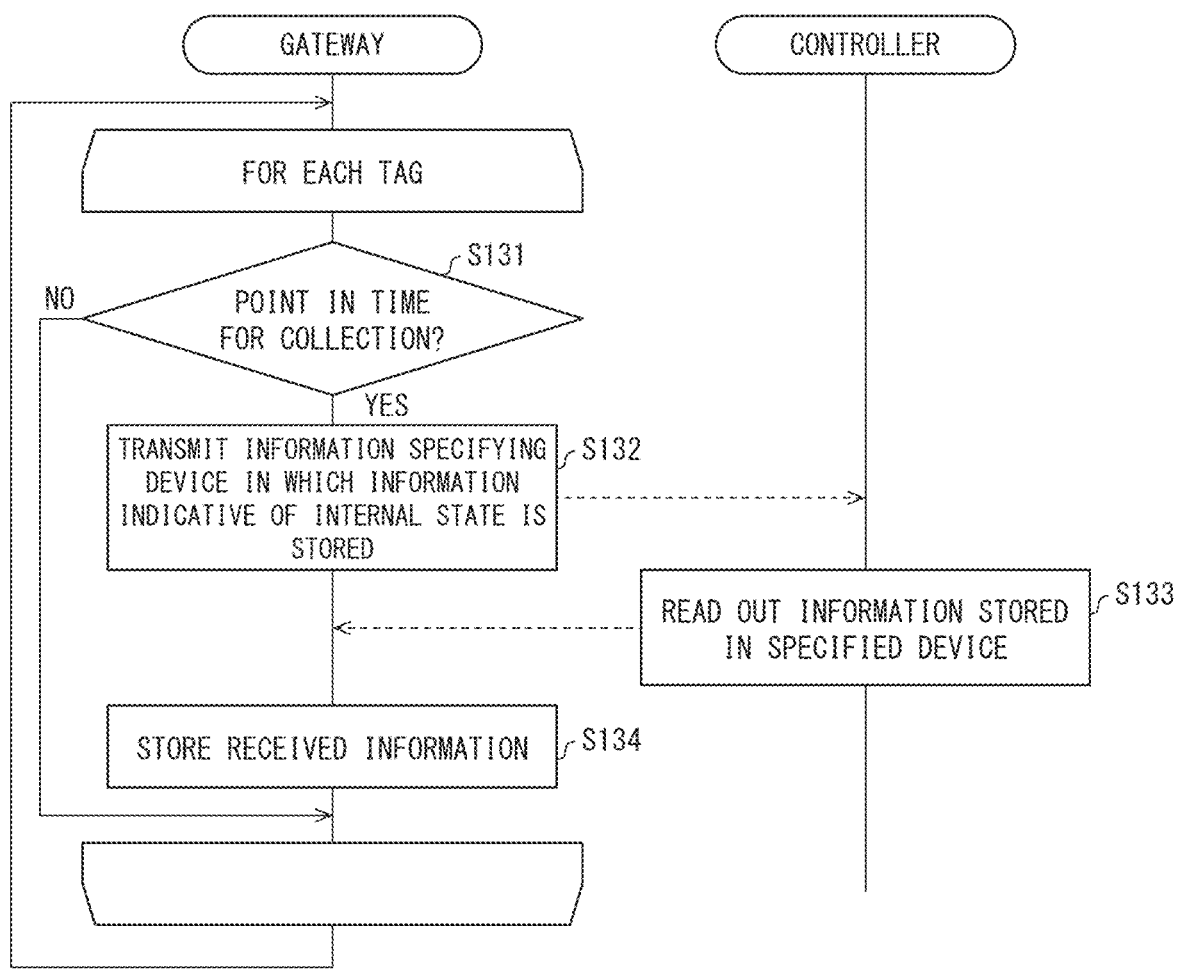

FIG. 14

MEASURED VALUE MONITOR

PIECE OF EQUIPMENT M1

| TIME AND DATE | TAG T11 (°C) | TAG T12 (ON/OFF) | TAG T21 (°C) | TAG T22 (rpm) | ... |
|---|---|---|---|---|---|
| 2019/2/1 8:30 | 68.2 | ON | 40.2 | 690 | ... |
| 2019/2/1 8:31 | 67.8 | ON | 37.8 | 668 | ... |
| 2019/2/1 8:31 | 65.9 | ON | 38.5 | 659 | ... |
| ... | ... | ... | ... | ... | ... |

FIG. 19

| EQUIPMENT NAME | TAG NAME | RULE TYPE | COMPONENT NAME | DETERMINATION CONDITION | | NUMBER OF CONSECUTIVE OCCURRENCES | DEGREE OF URGENCY | ACTION | NOTIFICATION DESTINATION |
|---|---|---|---|---|---|---|---|---|---|
| | | | | No. | | | | | |
| PIECE OF EQUIPMENT M1 | TAG T11 | EQUIPMENT ALARM | — | 1 | 150 OR MORE | 5 | ABNORMAL | EMAIL NOTIFICATION | PERSON a IN CHARGE, CLIENT b |
| | | | | 2 | 130 OR MORE | 3 | WARNING | EMAIL NOTIFICATION | PERSON a IN CHARGE |
| | | | | 3 | 100 OR MORE | 2 | CAUTION | DISPLAY ON MAIN SCREEN | — |
| PIECE OF EQUIPMENT M1 | TAG T21 | MAINTENANCE ALARM | COMPONENT A | 1 | 25 OR LESS | 1 | DANGER | EMAIL NOTIFICATION | PERSON c IN CHARGE, CLIENT d |
| | | | | 2 | 30 OR LESS | 1 | WARNING | EMAIL NOTIFICATION | PERSON c IN CHARGE |
| | | | | 3 | 35 OR LESS | 1 | CAUTION | DISPLAY ON MAIN SCREEN | — |
| PIECE OF EQUIPMENT M1 | TAG T12 | EQUIPMENT ALARM | — | 1 | ON→OFF | 5 | ABNORMAL | EMAIL NOTIFICATION | PERSON a IN CHARGE, CLIENT b |
| | | | | 2 | ON→OFF | 3 | WARNING | EMAIL NOTIFICATION | PERSON a IN CHARGE |
| | | | | 3 | ON→OFF | 2 | CAUTION | DISPLAY ON MAIN SCREEN | — |
| ‥ | ‥ | ‥ | ‥ | ‥ | ‥ | ‥ | ‥ | ‥ | ‥ |

FIG. 20

| | EQUIPMENT NAME | TAG NAME | RULE TYPE | COMPONENT NAME | DETERMINATION CONDITION No. | DETERMINATION CONDITION | NUMBER OF CONSECUTIVE OCCURRENCES | DEGREE OF URGENCY | ACTION | NOTIFICATION DESTINATION |
|---|---|---|---|---|---|---|---|---|---|---|
| rule1 | MOLDING MACHINE A | ABNORMALITY IN FRAME SETTING | EQUIPMENT ALARM | FRAME | 1 | 5mm OR MORE | 1 | ABNORMAL | DISPLAY ON MAIN SCREEN, EMAIL NOTIFICATION | PERSON a IN CHARGE, CLIENT b |
| | | | | | 2 | 3mm OR MORE | 1 | WARNING | DISPLAY ON MAIN SCREEN | — |
| | | | | | 3 | 2mm OR MORE | 1 | CAUTION | DISPLAY ON MAIN SCREEN | — |
| rule2 | MOLDING MACHINE A | HYDRAULIC OPERATING PRESSURE DECR | EQUIPMENT ALARM | HYDRAULIC PUMP | 1 | 5MPa OR LESS | 1 | ABNORMAL | DISPLAY ON MAIN SCREEN, EMAIL NOTIFICATION | PERSON a IN CHARGE, CLIENT b |
| | | | | | 2 | 6MPa OR LESS | 1 | WARNING | DISPLAY ON MAIN SCREEN | — |
| | | | | | 3 | 7MPa OR LESS | 1 | CAUTION | DISPLAY ON MAIN SCREEN | — |
| rule3 | MOLDING MACHINE A | OIL LEVEL ABNORMAL DECREASE | EQUIPMENT ALARM | OIL SEAL VALVE | 1 | 80L OR LESS | 1 | ABNORMAL | DISPLAY ON MAIN SCREEN, EMAIL NOTIFICATION | PERSON a IN CHARGE, CLIENT b |
| | | | | | 2 | 85L OR LESS | 1 | WARNING | DISPLAY ON MAIN SCREEN | — |
| | | | | | 3 | 90L OR LESS | 1 | CAUTION | DISPLAY ON MAIN SCREEN | — |
| rule4 | SHOTBLASTING MACHINE B | ABNORMAL THERMAL TRIP IN MOTOR | EQUIPMENT ALARM | MOTOR | 1 | 15A OR MORE | 1 | ABNORMAL | EMAIL NOTIFICATION | PERSON a IN CHARGE, CLIENT b |
| rule5 | SHOTBLASTING MACHINE B | EXCESSIVE TIME OF USE OF LINER | MAINTENANCE ALARM | LINER | 1 | 500Hr OR MORE | 1 | WARNING | EMAIL NOTIFICATION | PERSON a IN CHARGE, CLIENT b |
| rule6 | SHOTBLASTING MACHINE B | LOWER LIMIT DETECTION OF CONSUMABLES | MAINTENANCE ALARM | SHOT MATERIAL | 1 | 25.8A OR LESS | 1 | WARNING | EMAIL NOTIFICATION | PERSON a IN CHARGE, CLIENT b |
| rule7 | SHOTBLASTING MACHINE B | EXCESSIVE INTERVAL BETWEEN SUPPLIES OF OIL TO BEARING | MAINTENANCE ALARM | BEARING | 1 | 350Hr OR MORE | 1 | WARNING | EMAIL NOTIFICATION | PERSON a IN CHARGE, CLIENT b |
| rule8 | MOLDING MACHINE C | ABNORMAL UPWARD END OF CYLINDER | EQUIPMENT ALARM | AUTOMATIC SWITCH | 1 | ON→OFF | 1 | ABNORMAL | EMAIL NOTIFICATION | PERSON a IN CHARGE, CLIENT b |
| rule9 | MOLDING MACHINE C | ABNORMALITY IN AERATION PRESSURE SENSOR | EQUIPMENT ALARM | PRESSURE SENSOR | 1 | ON→OFF | 1 | ABNORMAL | EMAIL NOTIFICATION | PERSON a IN CHARGE, CLIENT b |
| rule10 | MOLDING MACHINE C | ABNORMALITY IN SQUEEZE BOARD CY ENCODER | EQUIPMENT ALARM | ENCODER | 1 | ON→OFF | 1 | ABNORMAL | EMAIL NOTIFICATION | PERSON a IN CHARGE, CLIENT b |

FIG. 21

| EQUIPMENT ALARM | | | | | G9 |
|---|---|---|---|---|---|
| TIME AND DATE OF GENERATION | PIECE OF EQUIPMENT | DEGREE OF URGENCY | ALARM | | G902 |
| 2019/2/28 12:11 | PIECE OF EQUIPMENT M1 | ABNORMAL | TAG T11 | DETAIL | RELATED |
| 2019/2/28 9:13 | PIECE OF EQUIPMENT M2 | CAUTION | TAG T13 | DETAIL | RELATED |
| 2019/2/27 11:51 | PIECE OF EQUIPMENT M3 | WARNING | TAG T22 | DETAIL | RELATED |
| : | : | : | : | : | |

FIG. 22

MAINTENANCE ALARM

| TIME AND DATE OF GENERATION | PIECE OF EQUIPMENT | COMPONENT | DEGREE OF URGENCY | ALARM | | |
|---|---|---|---|---|---|---|
| 2019/2/28 12:11 | PIECE OF EQUIPMENT M2 | COMPONENT C | DANGER | TAG T14 | DETAIL | COMPONENT |
| 2019/2/28 9:13 | PIECE OF EQUIPMENT M2 | COMPONENT D | CAUTION | TAG T23 | DETAIL | COMPONENT |
| 2019/2/27 11:51 | PIECE OF EQUIPMENT M1 | COMPONENT A | WARNING | TAG T21 | DETAIL | COMPONENT |
| : | : | : | : | : | | |

INFORMATION PROCESSING SYSTEM, GATEWAY, SERVER, AND INFORMATION PROCESSING METHOD

TECHNICAL FIELD

The present invention relates to an information processing system, a gateway, a server, and a method for managing a piece of equipment in a production facility.

BACKGROUND ART

An information processing system that manages a piece of equipment in a production facility is known. The information processing system includes a sensor installed in the production facility, and manages the piece of equipment by collecting information from the piece of equipment and information from the sensor.

For example, Patent Literature 1 discloses a production line monitoring system including a production line programmable logic controller (PLC), a data collection PLC, and a gateway terminal which are installed in a production site and a server which is installed in a remote location. The data collection PLC obtains production line data outputted from the production line PLC and indicative of an operating status of a piece of equipment and obtains, as sensor data, values outputted from various sensors. The data collection PLC outputs the production line data and the sensor data thus obtained to the gateway terminal. The gateway terminal receives the production line data and the sensor data outputted from the data collection PLC, and transmits these data to the server installed in the remote location via a network. The server accumulates the production line data and the sensor data transmitted from the gateway terminal, and causes these different types of data to be viewable from a client terminal.

Further, Patent Literature 2 discloses a running and maintenance support system in which a running control apparatus, a sensor apparatus, a power board, and a data logger are installed in a facility. The data logger collects, from a PLC in the power board, a running state of the running control apparatus and measurement data measured by the sensor apparatus. The data logger causes the measurement data to be viewable from a mobile information terminal of a site manager via a wireless network. The data logger also transmits the measurement data to an information terminal device of a professional engineer in a remote location via a network.

CITATION LIST

Patent Literature

[Patent Literature 1]
Japanese Patent Application Publication Tokukai No. 2018-63715 (Publication date: Apr. 19, 2018)
[Patent Literature 2]
Japanese Patent Application Publication Tokukai No. 2004-326468 (Publication date: Nov. 18, 2004)

SUMMARY OF INVENTION

Technical Problem

When using information from a sensor in addition to information from a piece of equipment in a production facility in order to manage the piece of equipment, it is preferable to have a high degree of freedom in increasing and decreasing the number of sensors in accordance with the circumstances at the production facility, needs of a user, and the like.

However, in the system disclosed in Patent Literature 1, data from a sensor is collected by the data collection PLC. As such, it is necessary in the system to rewrite a program of the PLC in order to increase and decrease the number of sensors. The system thus cannot be considered to have a high degree of freedom in increasing and decreasing the number of sensors.

In the system disclosed in Patent Literature 2, data from a sensor is collected by the PLC in the power board. As such, also in this system, it is necessary to rewrite a program of the PLC in order to increase and decrease the number of sensors. The system thus cannot be considered to have a high degree of freedom in increasing and decreasing the number of sensors.

The present invention is accomplished in order to solve the problem, and its object is to realize a system that manages a piece of equipment in a production facility with use of information from the piece of equipment and information from a sensor for measurement of a state of the piece of equipment, while having a high degree of freedom in increasing and decreasing the number of such sensors.

Solution to Problem

In order to solve the above problem, an information processing system in accordance with an aspect of the present invention is an information processing system for managing one or more pieces of equipment in at least one production facility. The system includes: one gateway or a plurality of gateways; and a server communicably connected to the one gateway or each of the plurality of gateways. The one gateway or the each of the plurality of gateways is communicably connected to a controller included in each of the one or more pieces of equipment and is communicably connected, without being intermediated by the controller included in the each of the one or more pieces of equipment, to an externally attached sensor accompanying the each of the one or more pieces of equipment. The one gateway or the each of the plurality of gateways carries out the processes of: (i) receiving information obtained by the controller and indicative of an internal state of the each of the one or more pieces of equipment; (ii) receiving information obtained by the sensor and indicative of an external state of the each of the one or more pieces of equipment; and (iii) transmitting, to the server, the information indicative of the internal state and the information indicative of the external state. The server carries out the process of (iv) combining and outputting the information indicative of the internal state and the information indicative of the external state received from the one gateway or the each of the plurality of gateways.

A gateway in accordance with an aspect of the present invention is a gateway which is communicably connected to a controller included in each of one or more pieces of equipment in a production facility and is communicably connected, without being intermediated by the controller included in the each of the one or more pieces of equipment, to an externally attached sensor accompanying the each of the one or more pieces of equipment. The gateway is further communicably connected to a server, and carries out the processes of: (i) receiving information obtained by the controller and indicative of an internal state of the each of the one or more pieces of equipment; (ii) receiving information obtained by the sensor and indicative of an external state of the each of the one or more pieces of equipment; and (iii) transmitting, to the server, the information indicative of the internal state and the information indicative of the external state.

A server in accordance with an aspect of the present invention is a server which is communicably connected to a gateway, the gateway transmitting: information which is obtained from a controller included in each of one or more pieces of equipment in at least one production facility and which is indicative of an internal state of the each of the one or more pieces of equipment; and information which is obtained, without being intermediated by the controller included in the each of the one or more pieces of equipment, from an externally attached sensor accompanying the each of the one or more pieces of equipment and which is indicative of an external state of the each of the one or more pieces of equipment. The server carries out a process of combining and outputting the information indicative of the internal state and the information indicative of the external state received from the gateway.

An information processing method in accordance with an aspect of the present invention is a method for managing one or more pieces of equipment in at least one production facility. The gateway is communicably connected to a controller included in each of the one or more pieces of equipment and is communicably connected to an externally attached sensor accompanying the each of the one or more pieces of equipment. The information processing method carries out the steps of: (i) receiving information obtained by the controller and indicative of an internal state of the each of the one or more pieces of equipment; (ii) receiving information obtained by the sensor accompanying and indicative of an external state of the each of the one or more pieces of equipment; and (iii) transmitting, to a server, the information indicative of the internal state and the information indicative of the external state. The server communicably connected to the gateway carries out the step of (iv) combining and outputting the information indicative of the internal state and the information indicative of the external state received from the gateway An information processing method in accordance with another aspect of the present invention is an information processing method carried out by a gateway which is communicably connected to a controller included in each of one or more pieces of equipment in a production facility and is communicably connected, without being intermediated by the controller included in the each of the one or more pieces of equipment, to an externally attached sensor accompanying the each of the one or more pieces of equipment, the gateway being further communicably connected to a server. The information processing method includes the steps of: (i) receiving information obtained by the controller and indicative of an internal state of the each of the one or more pieces of equipment; (ii) receiving information measured by the sensor accompanying and indicative of an external state of the each of the one or more pieces of equipment; and (iii) transmitting, to a server, the information indicative of the internal state and the information indicative of the external state.

An information processing method in accordance with another aspect of the present invention is an information processing method carried out by a server. The information processing method includes the step of: receiving, via a gateway, (i) information which is obtained from a controller included in each of one or more pieces of equipment in at least one production facility and which is indicative of an internal state of the each of the one or more pieces of equipment and (ii) information which is obtained, without being intermediated by the controller, from an externally attached sensor accompanying the each of the one or more pieces of equipment and which is indicative of an external state of the each of the one or more pieces of equipment.

Advantageous Effects of Invention

According to an aspect of the present invention, it is possible to realize an information processing system that manages a piece of equipment in a production facility with use of information from the piece of equipment and information from a sensor for measurement of a state of the piece of equipment, while having a high degree of freedom in increasing and decreasing the number of such sensors.

BRIEF DESCRIPTION OF DRAWINGS

FIG. 4 is a block diagram illustrating a specific example of configuration data of a production line in Embodiment 1 of the present invention.

FIG. 6 is a flow chart illustrating an operation of the information processing system in accordance with Embodiment 1 of the present invention.

(a) of FIG. 7 is a diagram illustrating an example of a setting screen displayed in Embodiment 1 of the present invention. (b) of FIG. 7 is a diagram illustrating an example of setting data set by the setting screen.

(a) of FIG. 8 is a diagram illustrating an example of a setting screen displayed in Embodiment 1 of the present invention. (b) of FIG. 8 is a diagram illustrating an example of setting data set by the setting screen.

FIG. 9 is a diagram illustrating an example of collection setting data in Embodiment 1 of the present invention.

FIG. 10 is a flow chart illustrating details of an operation of the gateway in accordance with Embodiment 1 of the present invention.

Figure 11:
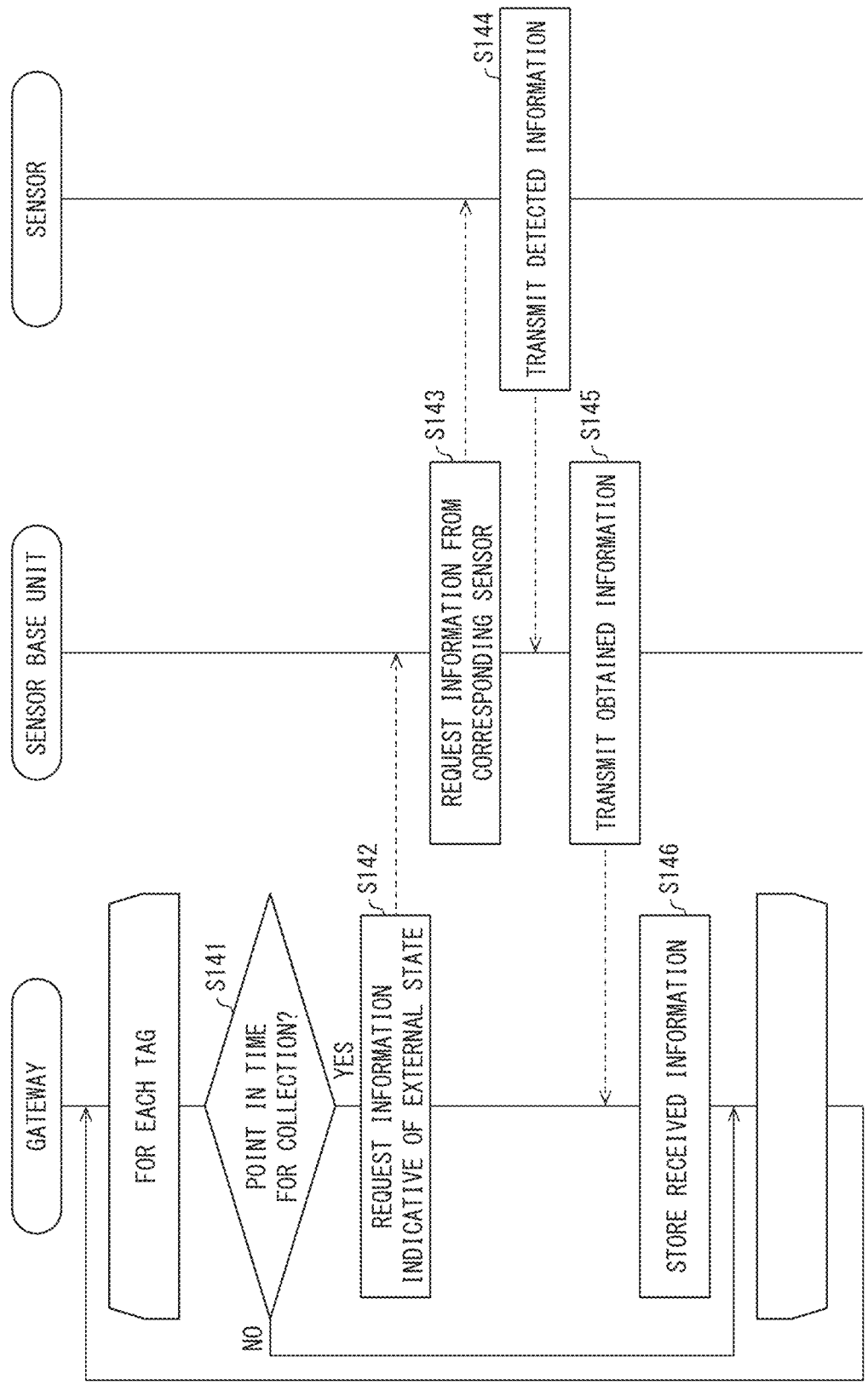

FIG. 11 is a flow chart illustrating details of an operation of the gateway in accordance with Embodiment 1 of the present invention.

Figure 12:
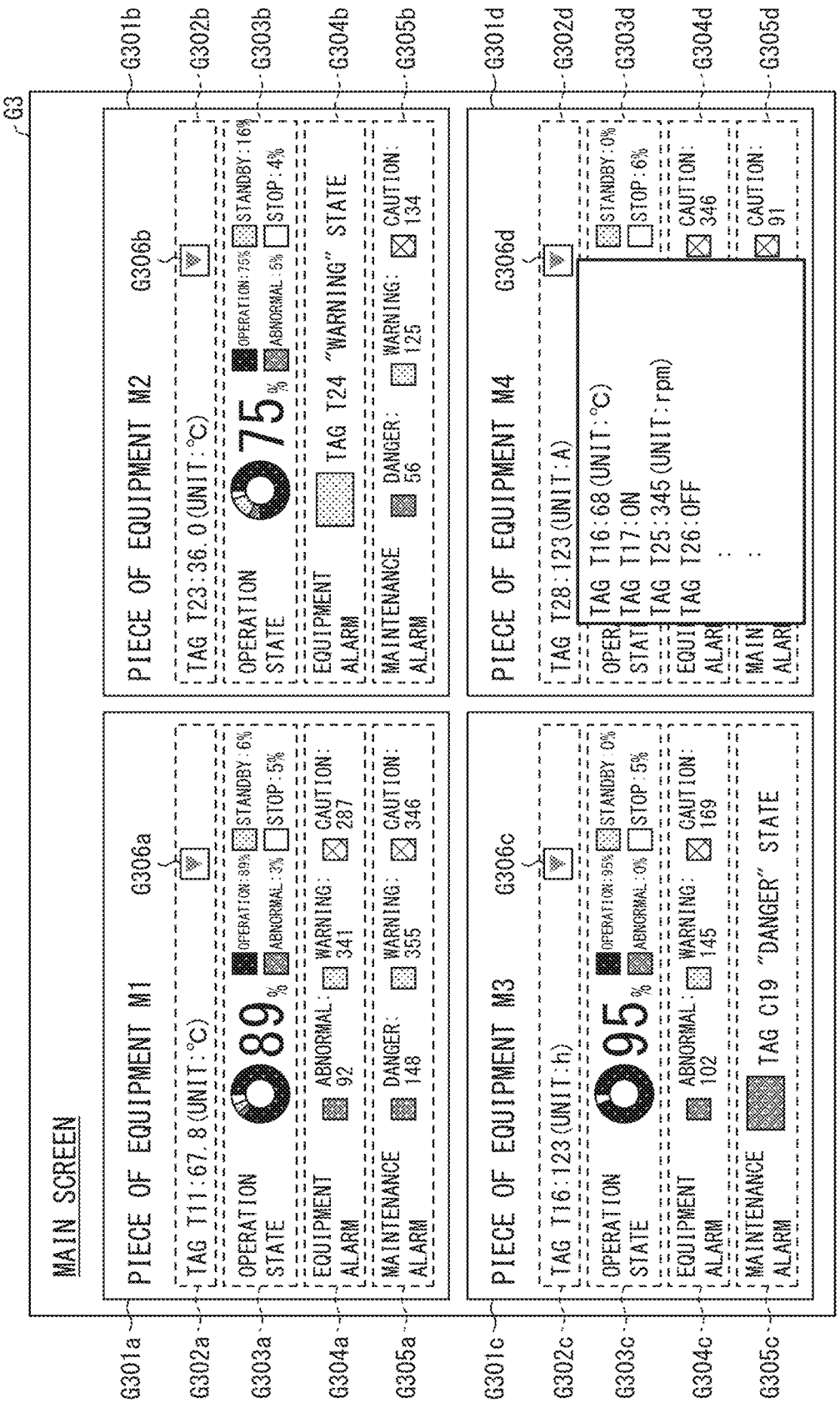

FIG. 12 is a diagram illustrating an example of a screen which is displayed in Embodiment 1 of the present invention and which indicates states and alarms of a plurality of pieces of equipment.

Figure 13:
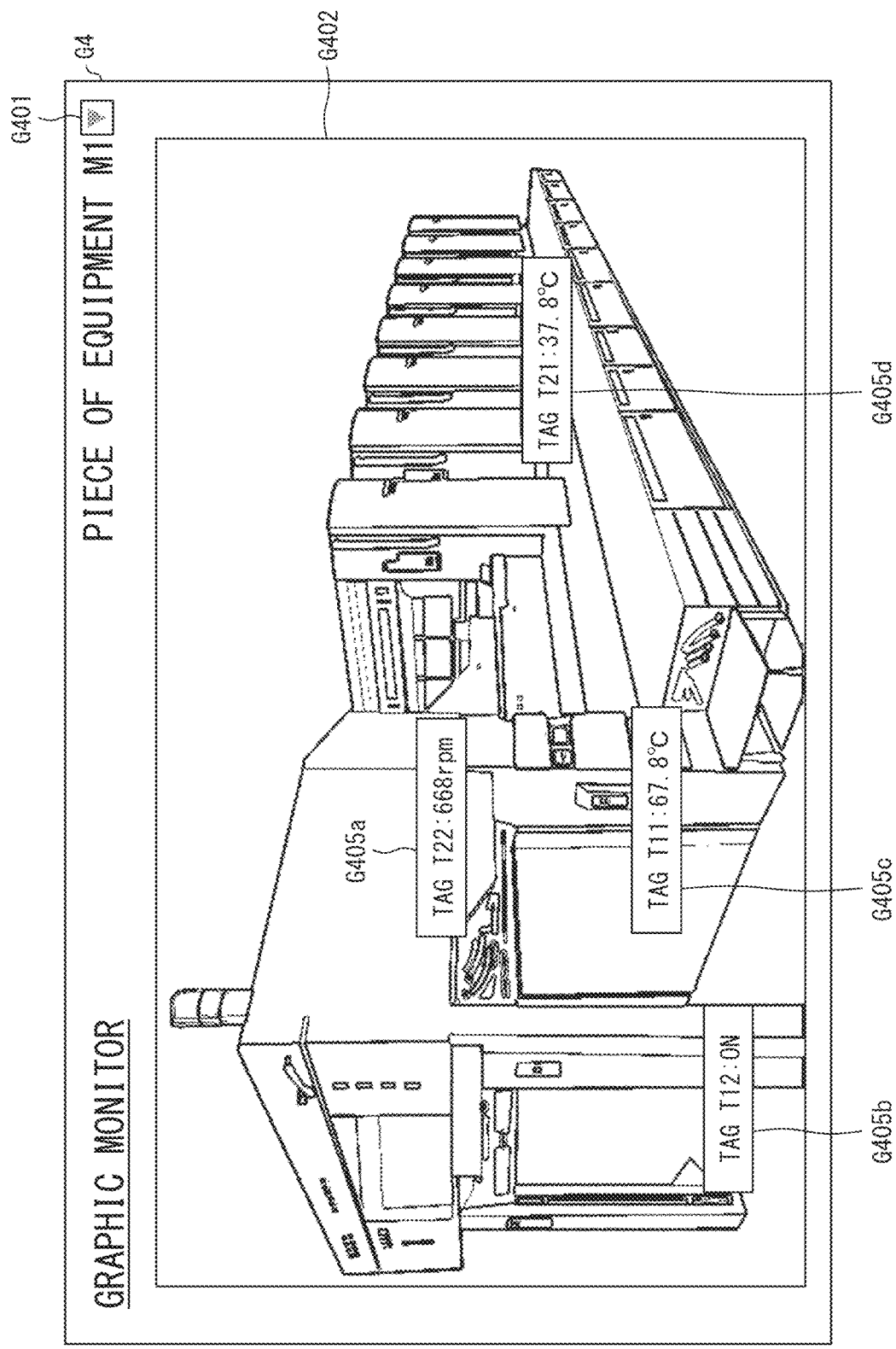

FIG. 13 is a diagram illustrating an example of a screen which is displayed in Embodiment 1 of the present invention and which indicates a state of a piece of equipment.

FIG. 14 is a diagram illustrating an example of a screen which is displayed in Embodiment 1 of the present invention and which indicates a state of a piece of equipment.

Figure 15:
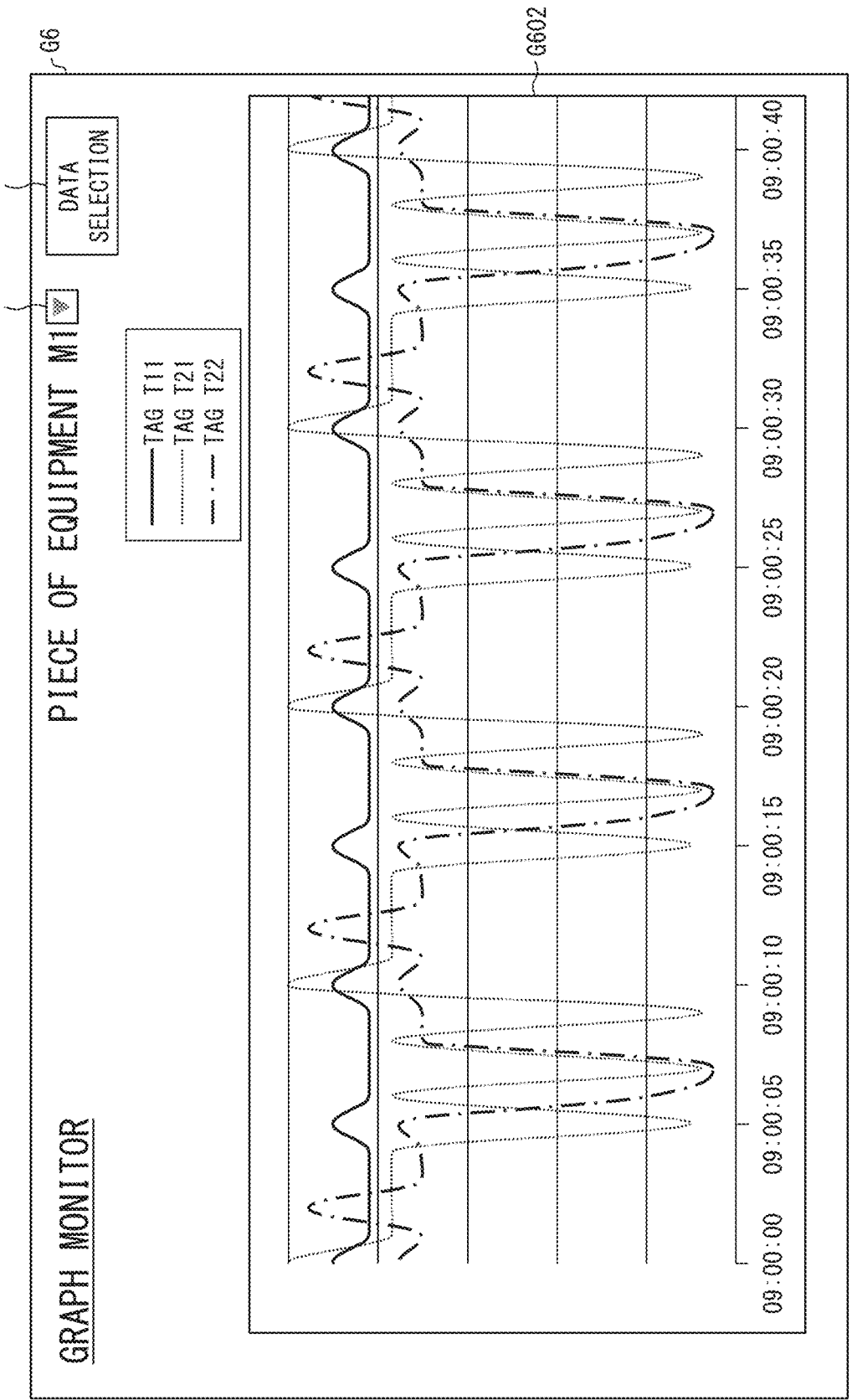

FIG. 15 is a diagram illustrating an example of a screen which is displayed in Embodiment 1 of the present invention and which indicates a state of a piece of equipment.

Figure 16:
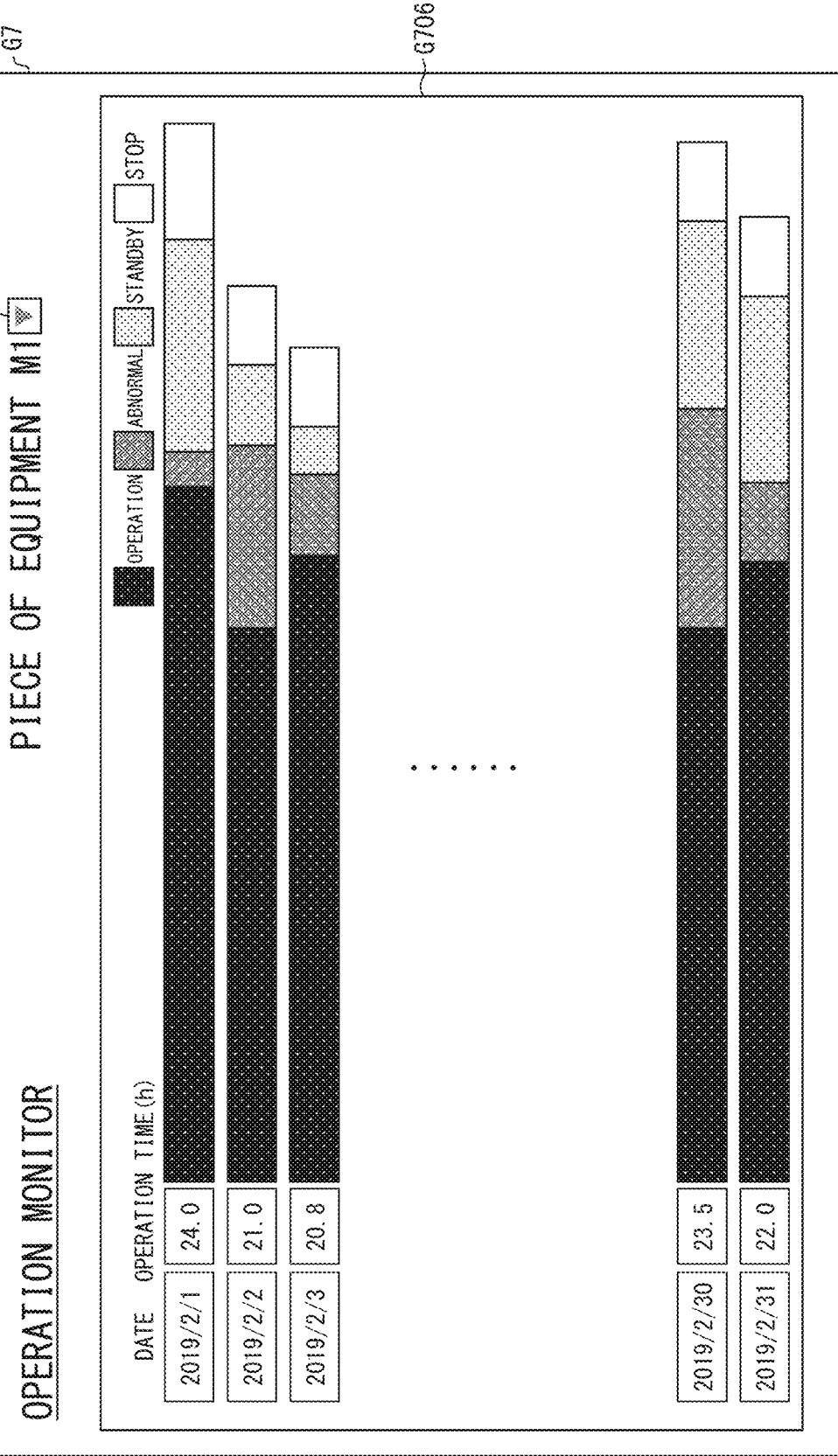

FIG. 16 is a diagram illustrating an example of a screen which is displayed in Embodiment 1 of the present invention and which indicates a state of a piece of equipment.

Figure 17:
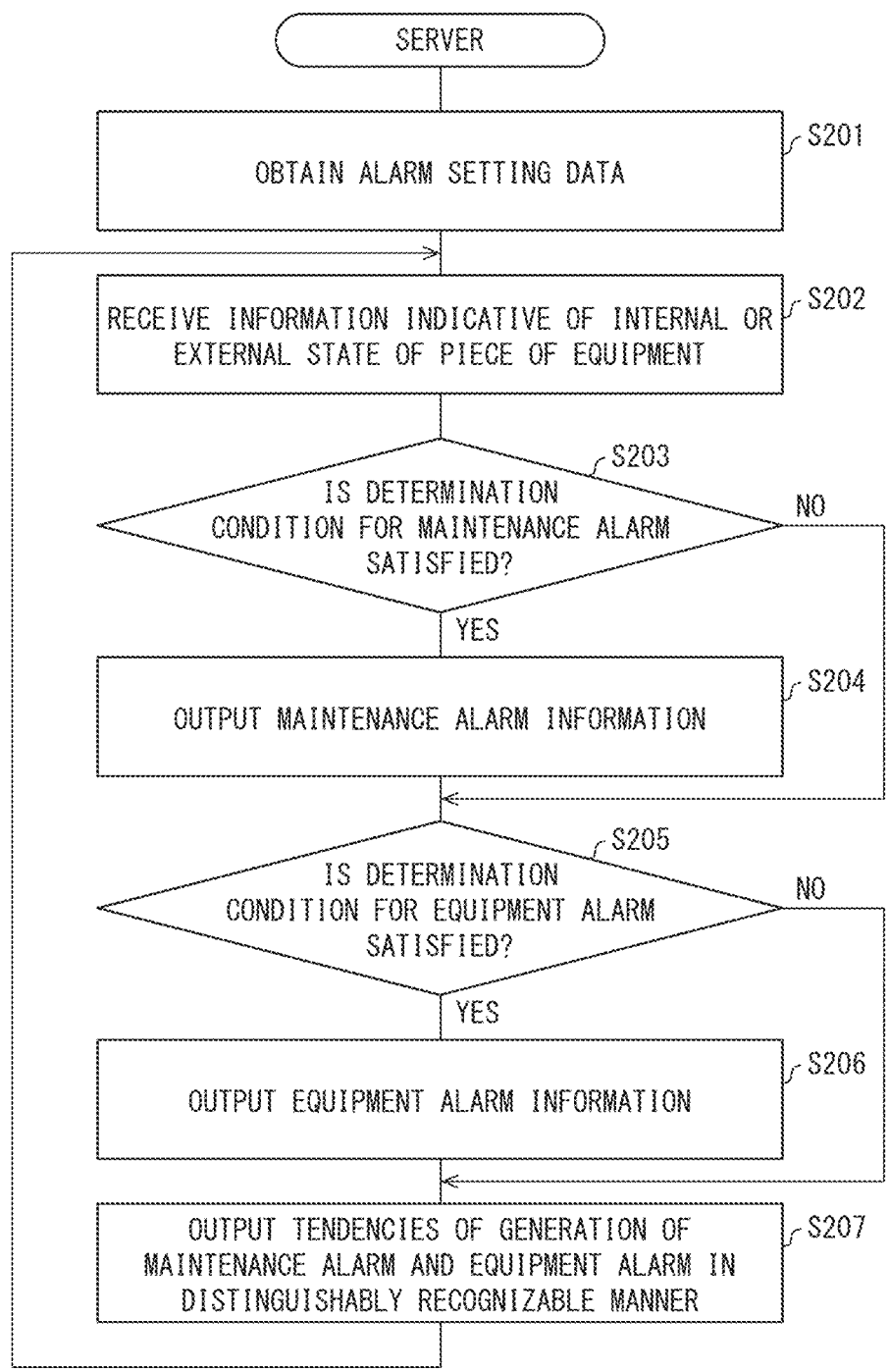

FIG. 17 is a flow chart illustrating an operation of the server in accordance with Embodiment 1 of the present invention.

Figure 18:
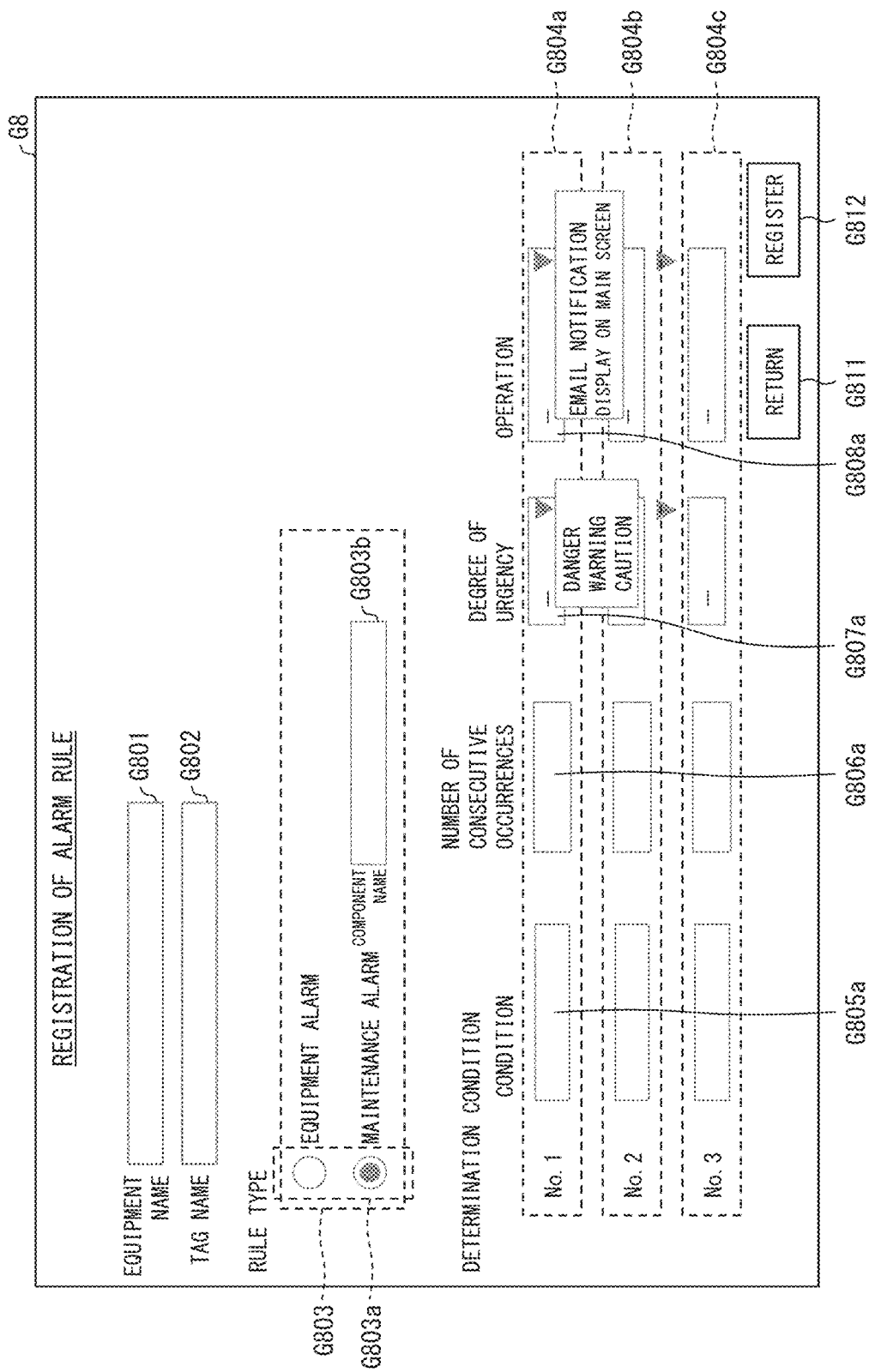

FIG. 18 is a diagram illustrating an example of a setting screen displayed in Embodiment 1 of the present invention.

FIG. 19 is a diagram illustrating an example of setting data set by the setting screen illustrated in FIG. 18.

FIG. 20 is a diagram illustrating a specific example of the setting data illustrated in FIG. 19.

FIG. 21 is a diagram illustrating an example of a screen which is displayed in Embodiment 1 of the present invention and which indicates an equipment alarm.

FIG. 22 is a diagram illustrating an example of a screen which is displayed in Embodiment 1 of the present invention and which indicates a maintenance alarm.

Figure 23:
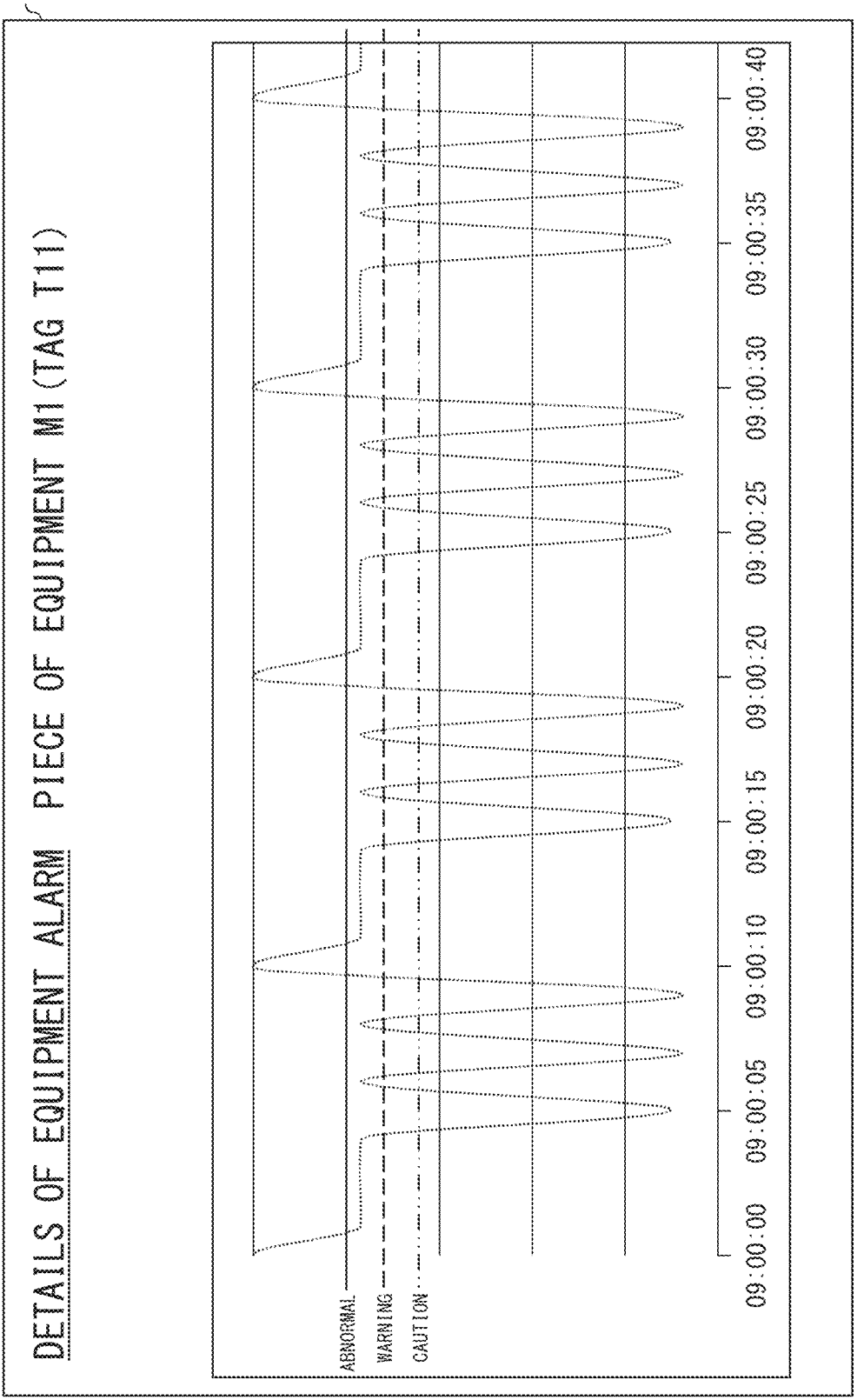

FIG. 23 is a diagram illustrating an example of a screen which is displayed in Embodiment 1 of the present invention and which indicates details of an equipment alarm.

Figure 24:
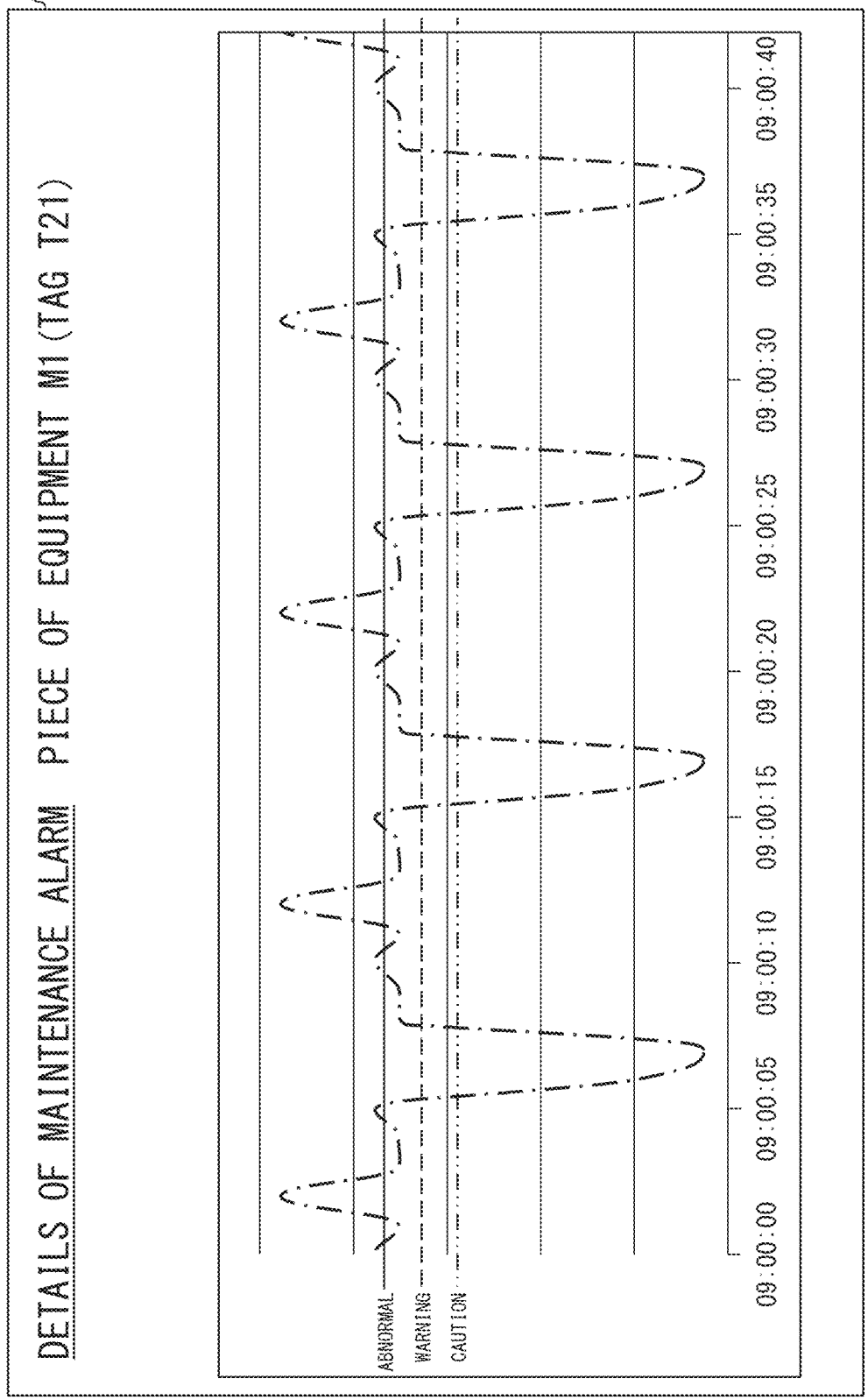

FIG. 24 is a diagram illustrating an example of a screen which is displayed in Embodiment 1 of the present invention and which indicates details of a maintenance alarm.

Figure 25:
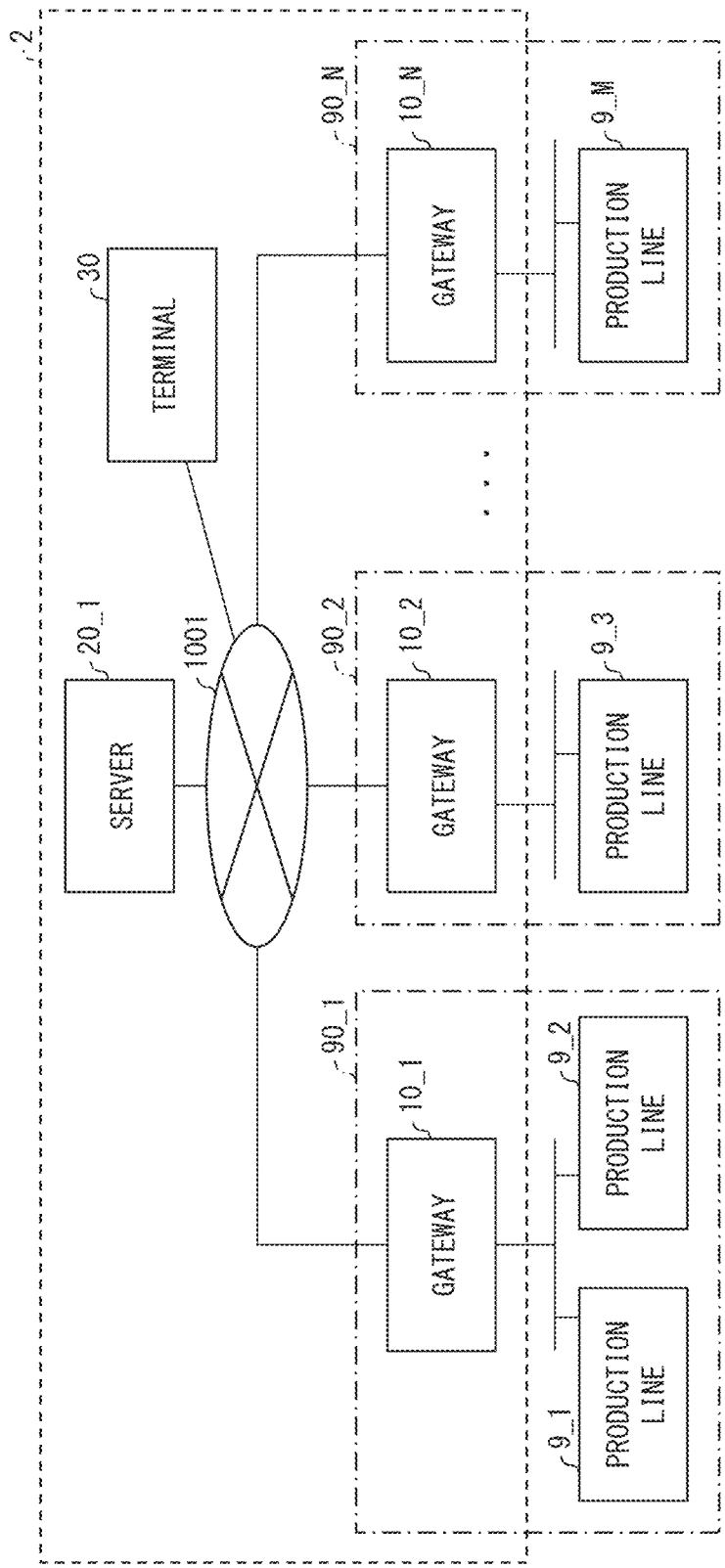

FIG. 25 is a block diagram illustrating a configuration of an information processing system in accordance with Embodiment 2 of the present invention.

DESCRIPTION OF EMBODIMENTS

Embodiment 1

The following description will discuss Embodiment 1 of the present invention in detail.

<Configuration of Information Processing System 1>

Figure 1:
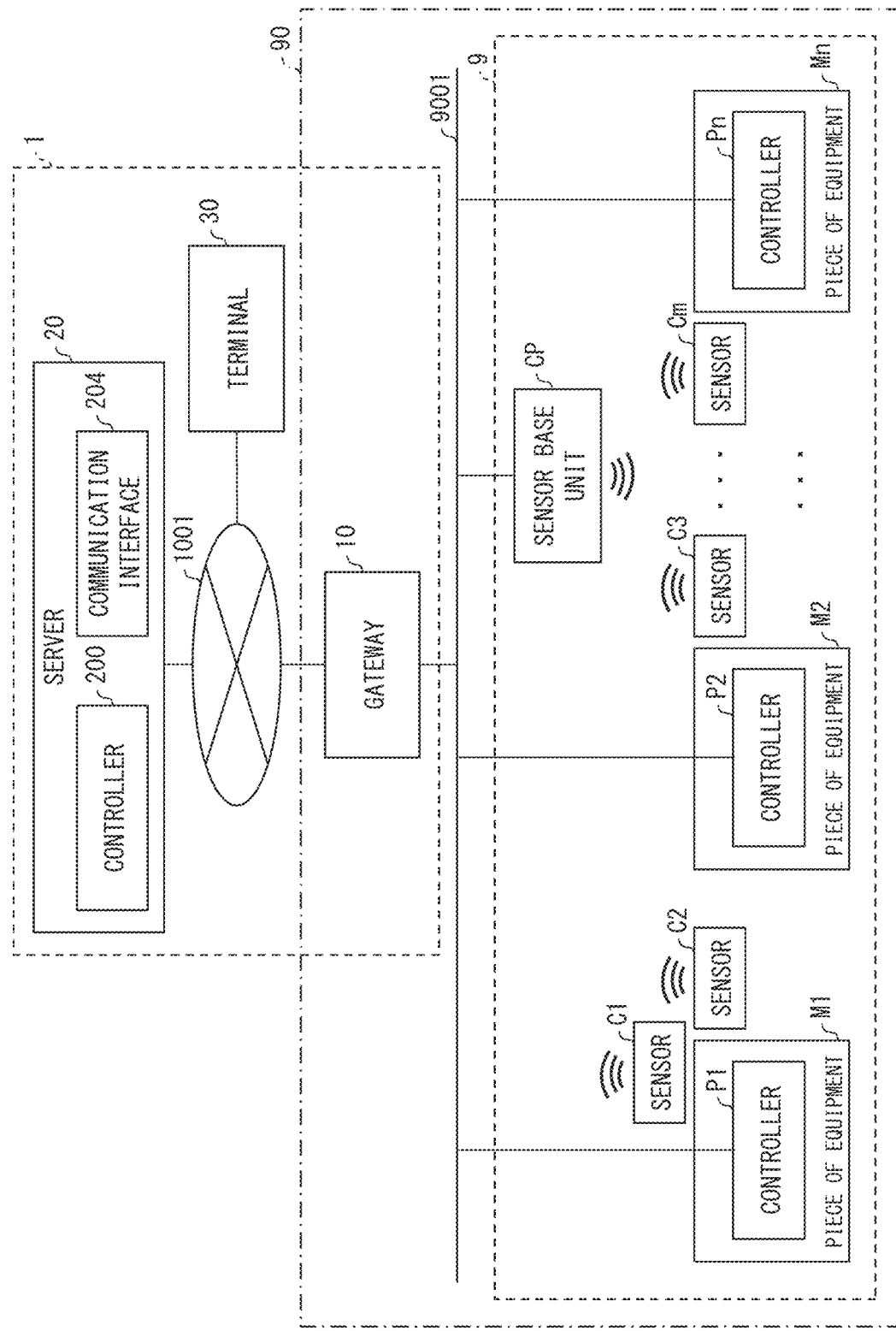
FIG. 1 is a block diagram illustrating a configuration of an information processing system in accordance with Embodiment 1 of the present invention.

FIG. 1 is a block diagram illustrating a configuration of an information processing system 1 in accordance with Embodiment 1. In FIG. 1, the information processing system 1 includes a gateway 10, a server 20, and a terminal 30. The information processing system 1 is a system that manages n pieces of equipment Mi (i=1 to n, and n is an integer of not less than 1) in a production line 9. The server 20 is an example of an information processing device in the present invention.

The gateway 10 is installed in a production facility 90 including the production line 9 and collects information pertaining to a state of each piece of equipment Mi. The server 20 is connected to the gateway 10 via a wide area network (WAN) 1001 and receives information pertaining to a state of each piece of equipment Mi via the gateway 10. The terminal 30 is connected to the server 20 via the WAN 1001 and displays information that is provided by the server 20 and that pertains to each piece of equipment Mi. For example, the terminal 30 can be a laptop personal computer, a smartphone, a tablet computer, or the like carried by a person in charge of maintenance of each piece of equipment Mi. For example, the terminal 30 can be installed in a support center that handles maintenance of the production line 9. For example, the terminal 30 can be installed in the production facility 90 for use by a person on site who is in charge of the production line 9. FIG. 1 shows an example in which a single terminal 30 is included in the information processing system 1. However, the information processing system 1 can include a plurality of terminals 30. For example, one of the plurality of terminals 30 can be carried by the above person in charge of the maintenance, another one of the plurality of terminals 30 can be set in the above support center, and yet another one of the plurality of terminals 30 can be installed in the production facility 90.

(Configuration of Production Line 9)

The production line 9 includes the n pieces of equipment Mi, n controllers Pi, m externally attached sensors Cj (j=1 to m, and m is an integer of not less than 1), and a sensor base unit CP, as illustrated in FIG. 1. Examples of the production line 9 include, but are not limited to, a line for manufacturing a mold or the like.

Each piece of equipment Mi includes a controller Pi built therein. Examples of the piece of equipment Mi include, but are not limited to, a molding machine, a blasting machine, and a dust collector.

Each controller Pi controls a piece of equipment Mi. Examples of the controller Pi include a programmable logic controller (PLC) controller that operates in accordance with programs for controlling sections of the piece of equipment Mi. The controller Pi obtains information indicative of an internal state of the piece of equipment Mi. Examples of the information indicative of the internal state include, but are not limited to, a power state of the piece of equipment Mi, a standby state of the piece of equipment Mi, the number of times inspection of a predetermined component of the piece of equipment Mi has been carried out, an operating time of a predetermined component of the piece of equipment Mi, a time and date of replacement of a predetermined component of the piece of equipment Mi, a process time that has been required for a predetermined operation by the piece of equipment Mi, and information measured by a sensor included in the piece of equipment Mi. However, the information indicative of the internal state is not limited to the above information.

The controller Pi is connected to the gateway 10 (described later) via a local area network (LAN) 9001 installed in the production facility 90. The LAN 9001 is composed of a wired LAN, a wireless LAN, or a combination thereof. In response to a request from the gateway 10, the controller Pi transmits requested information to the gateway 10.

The sensors Cj accompany at least one of the pieces of equipment M1 through Mn. Note that accompanying means that each sensor Cj is retrofitted to a piece of equipment Mi in order to measure an external state of the piece of equipment Mi. The location where the sensor Cj is installed can be inside or outside the piece of equipment M. The number of sensors Cj accompanying a single piece of equipment Mi is not limited to one, but can be more than one. Further, among the n pieces of equipment Mi, there can be a piece of equipment Mi not accompanied by any sensor Cj. In the example illustrated in FIG. 1, the piece of equipment M1 is accompanied by the sensors C1 and C2. The piece of equipment M2 is accompanied by the sensor C3. The piece of equipment Mn is accompanied by the sensor Cm.

Each sensor Cj obtains information indicative of an external state of the piece of equipment Mi. An example of the information indicative of the external state can be information indicative of vibration of the piece of equipment Mi. Another example can be information indicative of a difference between respective pressures in two chambers (e.g., a clean room and a dirty room in a dust collector) in the piece of equipment Mi. Another example can be a value of a motor current for driving a component of the piece of equipment Mi to rotate. Another example can be information indicative of dirtiness of hydraulic oil in the piece of equipment Mi. Another example can be a temperature of hot water injected into the piece of equipment Mi. However, the information indicative of the external state is not limited to the above information. Further, examples of the sensor Cj include, but are not limited to, a vibration sensor, a current transformer (CT) sensor, a manometer, an in-oil degradation sensor, and a non-contact temperature sensor.

The sensor Cj is communicably connected to the sensor base unit CP. For example, the sensor Cj and the sensor base unit CP are connected to each other via a wireless sensor network. The wireless sensor network is constructed, for example, by near field wireless communication such as infrared and Bluetooth (registered trademark). The sensor base unit CP and the sensor Cj transmit and receive information to and from each other in accordance with a predetermined protocol. In other words, any sensor Cj that has a communication interface connectable to a wireless sensor network with which the sensor base unit CP is compatible and that transmits and receives information in accordance with a protocol with which the sensor base unit CP is compatible can be easily added by retrofitting as an accompaniment to any one of the pieces of equipment Mi.

The sensors Cj can be of a type that periodically measures information and transmits the information to the sensor base unit CP. The sensors Cj can be of a type that transmits information satisfying a predetermined condition to the sensor base unit CP in a case where the information is measured. The sensors Cj can be of a type that transmits, to the sensor base unit CP, information measured in response to a request from the sensor base unit CP.

The sensor base unit CP receives information that has been measured by each sensor Cj and that is indicative of an external state of a piece of equipment Mi. Note that the point in time at which the sensor base unit CP receives the information from the sensor Cj depends on the above-described types of the sensor Cj. The sensor base unit CP stores the information received from the sensor Cj in a memory (not illustrated) of the sensor base unit CP such that the information is associated with identification information of the sensor Cj.

The sensor base unit CP is connected to the gateway 10 via the LAN 9001. In response to a request from the gateway the sensor base unit CP reads, from the memory, information measured by a sensor Cj directed to by the request and transmits the information which has been read to the gateway 10. The information which is transmitted is information that is measured by the sensor Cj between a previous request from the gateway 10 and a current request from the gateway 10.

In Embodiment 1, the production line 9 has a single sensor base unit CP. However, the production line 9 can include a plurality of sensor base units configured similarly to the sensor base unit CP. In such a case, each sensor Cj is connected to any one of the plurality of sensor base units. Further, at least one of the plurality of sensor base units can be connected to a wireless sensor network that is different from a wireless sensor network to which at least one of the other sensor base units is connected. Further, at least one of the plurality of sensor base units can communicate with a sensor Cj with use of a protocol different from a protocol used by at least one of the other sensor base units.

(Hardware Configuration of Gateway 10)

Figure 2:
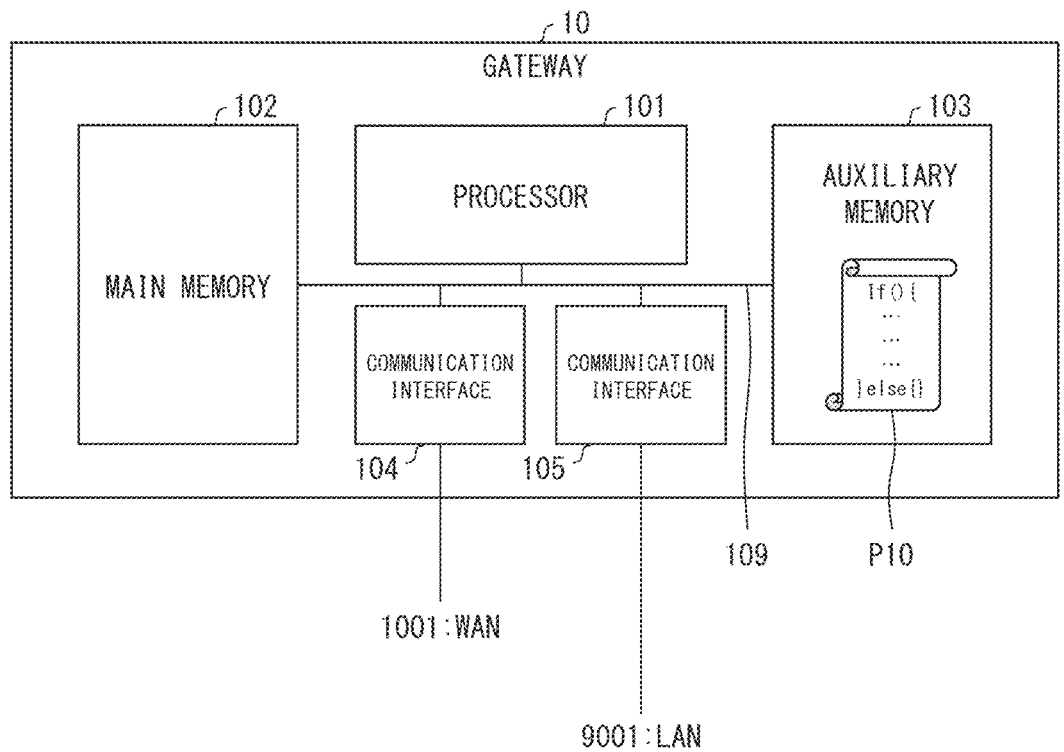
FIG. 2 is a block diagram illustrating a configuration of a gateway in accordance with Embodiment 1 of the present invention.

FIG. 2 is a block diagram illustrating a hardware configuration of the gateway 10. The gateway 10 includes a computer having a processor 101, a main memory 102, an auxiliary memory 103, a communication interface 104, and a communication interface 105. The main memory 102 and the auxiliary memory 103 are examples of a memory included in a gateway in the present invention. The communication interface 104 is an example of the following communication interfaces in the present invention: a communication interface that is included in the gateway and that communicates with a controller; and a communication interface that is included in the gateway and that communicates with a sensor without being intermediated by the controller. The communication interface 105 is an example of a communication interface that is included in the gateway and that communicates with the sensor in the present invention.

The processor 101, the main memory 102, the auxiliary memory 103, the communication interface 104, and the communication interface 105 are connected to one another via a bus 109. As the processor 101, for example, a single or a plurality of microprocessors, a single or a plurality of digital signal processors, a single or a plurality of microcontrollers, or a combination thereof can be used. As the main memory 102, for example, a single or a plurality of semiconductor random access memories (RAMs) can be used. As the auxiliary memory 103, for example, a single or a plurality of hard disk drives (HDDs), a single or a plurality of solid state drives (SSDs), or a combination thereof can be used. Part or all of the auxiliary memory 103 can be a storage on a network which storage is connected via the communication interface 104 or 105. The communication interface 104 is connected to the WAN 1001 such as the Internet. The communication interface 105 is connected to the LAN 9001 which is wireless or wired.

The auxiliary memory 103 stores a program P10 for causing the processor 101 to carry out a process S10 (described later) of the gateway 10. The processor 101 carries out steps included in the process S10 by causing the program P10 stored in the auxiliary memory 103 to be loaded in the main memory 102 and executing instructions contained in the program P10 loaded in the main memory 102. Further, the auxiliary memory 103 stores various pieces of data to which the processor 101 refers so as to carry out the process S10.

Note that the above description has discussed a mode in which the processor 101 carries out the process S10 in accordance with the program P10 stored in the auxiliary memory 103 which is an internal storage medium, but the present invention is not limited to this mode. For example, a mode can be alternatively employed in which the processor 101 carries out the process S10 in accordance with the program P10 stored in an external storage medium. In this case, the external storage medium can be a computer-readable "non-transitory tangible medium" such as a tape, a disk, a card, a semiconductor memory, or a programmable logic circuit. Alternatively, a mode can be employed in which the processor 101 carries out the process S10 in accordance with the program P10 obtained from the network connected via the communication interface 104 or 105.

The above description has discussed a mode in which the gateway 10 is realized using a single computer, but the present invention is not limited to this mode. That is, a mode can be alternatively employed in which the gateway 10 is realized using a plurality of computers configured to be communicable with each other. In this case, the steps of the process S10 can be carried out in parallel by these computers.

(Overview of Functions of Gateway 10)

The gateway 10 has a function of obtaining, from each controller Pi, information indicative of an internal state of a piece of equipment Mi. To this end, the gateway 10 transmits and receives information to and from the controller Pi in accordance with a connection protocol with which the controller Pi is compatible.

Further, the gateway 10 has a function of obtaining, from each sensor Cj, information indicative of an external state of a piece of equipment Mi. To this end, the gateway 10 transmits and receives information to and from the sensor base unit CP in accordance with a connection protocol with which the sensor base unit CP is compatible.

The gateway 10 has a function of obtaining, from each controller Pi and each sensor Cj, pieces of information respectively indicative of an internal state and an external state of a piece of equipment Mi and transmitting the pieces of information thus obtained to the server 20. Hereinafter, obtaining these pieces of information may be referred to as collecting. A collection process is carried out in accordance with collection setting data (described later).

(Information Stored in Gateway 10)

The gateway 10 stores the collection setting data in the auxiliary memory 103. The collection setting data is received from the server 20. Details of the collection setting data will be discussed later.

(Hardware Configuration of Server 20)

Figure 3:
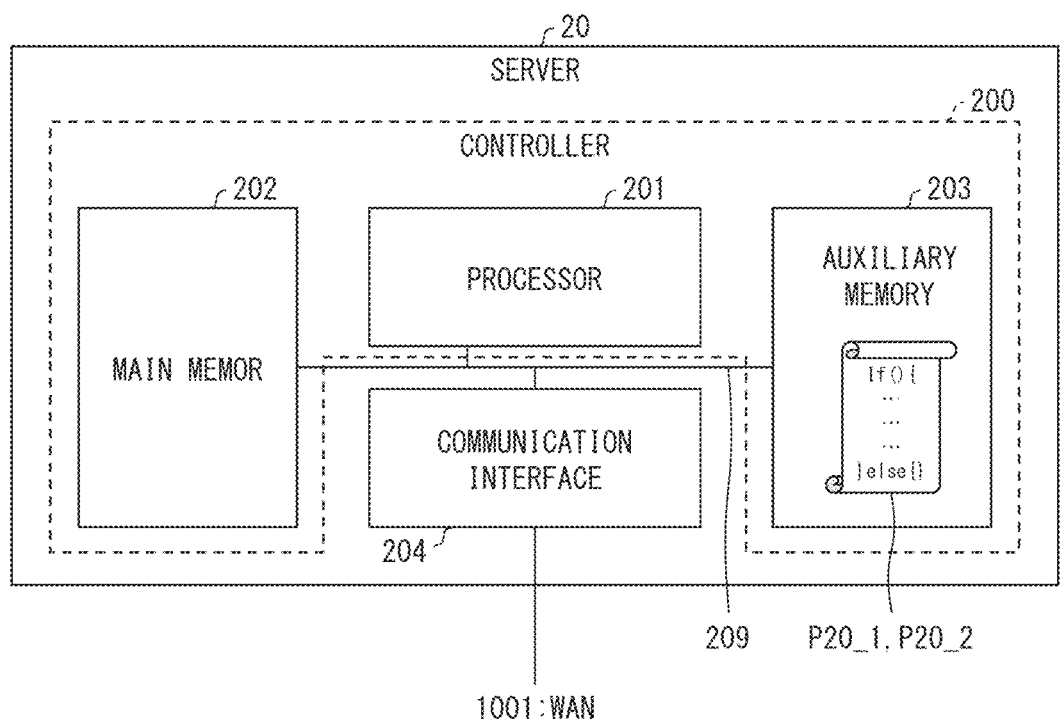
FIG. 3 is a block diagram illustrating a configuration of a server in accordance with Embodiment 1 of the present invention.

FIG. 3 is a block diagram illustrating a hardware configuration of the server 20. The server 20 includes a computer including a controller 200 and a communication interface 204. The controller 200 includes a processor 201, a main memory 202, and an auxiliary memory 203. The main memory 202 and the auxiliary memory 203 are examples of a memory included in a server in the present invention. The communication interface 204 is an example of a communication interface included in the server in the present invention.

The processor 201, the main memory 202, the auxiliary memory 203, and the communication interface 204 are connected to one another via a bus 209. As the processor 201, for example, a single or a plurality of microprocessors, a single or a plurality of digital signal processors, a single or a plurality of microcontrollers, or a combination thereof can be used. As the main memory 202, for example, a single or a plurality of semiconductor RAMs can be used. As the auxiliary memory 203, for example, a single or a plurality of HDDs, a single or a plurality of SSDs, or a combination thereof can be used. Part or all of the auxiliary memory 203 can be a storage on a network which storage is connected via the communication interface 204. The communication interface 204 is connected to the WAN 1001.

The auxiliary memory 203 stores programs P20_1 and P20_2 for causing the processor 201 to carry out processes S20_1 and S20_2 (described later) of the server 20. The processor 201 causes the programs P20_1 and P20_2 stored in the auxiliary memory 203 to be loaded in the main memory 202 and executes instructions contained in the programs P20_1 and P20_2 loaded in the main memory 202. The processor 201 thus carries out steps included in each of the processes S20_1 and S20_2. Further, the auxiliary memory 203 stores various pieces of data to which the processor 201 refers so as to carry out the processes S20_1 and S20_2.

The communication interface 204 is connected to the gateway 10 and the terminal 30 via the WAN 1001.

Note that the above description has discussed a mode in which the processor 201 carries out the processes S20_1 and S20_2 in accordance with the programs P20_1 and P20_2 stored in the auxiliary memory 203 which is an internal storage medium, but the present invention is not limited to this mode. That is, a mode can be alternatively employed in which the processor 201 carries out the processes S20_1 and S20_2 in accordance with the programs P20_1 and P20_2 stored in an external storage medium. In this case, the external storage medium can be a computer-readable "non-transitory tangible medium" such as a tape, a disk, a card, a semiconductor memory, or a programmable logic circuit. Alternatively, a mode can be employed in which the processor 201 carries out the processes S20_1 and S20_2 in accordance with the programs P20_1 and P20_2 obtained from the network connected via the communication interface 204.

The above description has discussed a mode in which the server 20 is realized using a single computer, but the present invention is not limited to this mode. That is, a mode can be alternatively employed in which the server 20 is realized using a plurality of computers configured to be communicable with each other. In this case, the steps of each of the processes S20_1 and S20_2 can be carried out in parallel by these computers.

(Overview of Functions of Server 20)

The server 20 has a function of accumulating information indicative of an internal state and information indicative of an external state collected for each piece of equipment M.

Further, the server 20 has a function of combining and outputting information indicative of an internal state of each piece of equipment M and information indicative of an external state of the piece of equipment M. Combining and outputting can mean outputting statistical information pertaining to the information indicative of the internal state and the information indicative of the external state of the piece of equipment Mi. Combining and outputting can mean that the information indicative of the internal state and the information indicative of the external state of the piece of equipment Mi are outputted so as to be included in the same screen. As an example of combining and outputting, the total number of (i) the number of outputs of an alarm based on the information indicative of the internal state of the piece of equipment Mi and (ii) the number of outputs of an alarm based on the information indicative of the external state of the piece of equipment Mi can be outputted. As another example of combining and outputting, a graph representing a change with time in the information indicative of the internal state of the piece of equipment Mi and a graph representing change with time in the information indicative of the external state of the piece of equipment Mi can be superimposed with respect to a common time axis. As another example of combining and outputting, the information indicative of the internal state of the piece of equipment Mi and the information indicative of the external state of the piece of equipment Mi can be superimposed on an appearance image of the piece of equipment Mi, at positions corresponding to the respective states. Specific examples of these examples will be discussed later.

Further, the server 20 has a function of outputting, for each piece of equipment Mi, a tendency in which a maintenance alarm (described later) is outputted and a tendency in which an equipment alarm (described later) is outputted. That the maintenance alarm or the equipment alarm is outputted can mean that the maintenance alarm or the equipment alarm is outputted to an output device, or can mean that the maintenance alarm or the equipment alarm is transmitted to a predetermined contact address (e.g., email address, telephone number, or the like) by a predetermined communication means (e.g., email, telephone, facsimile, or the like). Further, the tendency in which each of the maintenance alarm and the equipment alarm is outputted is represented by, for example, but not limited to, statistical information such as the total number of outputs; a change with time in physical quantity that causes the alarm to be outputted; and the like. Hereinafter, a tendency in which an alarm is outputted may be referred to as a tendency of generation of an alarm.

The server 20 also has a function of obtaining the collection setting data, which indicates what kind of information should be collected as information indicative of an internal state of each piece of equipment Mi and what kind of information should be collected as information indicative of an external state of each piece of equipment Mi.

The server 20 also has a function of obtaining alarm setting data in which, for each piece of equipment Mi, a determination condition for determining a state of each piece of equipment Mi and a type indicative of one of the maintenance alarm and the equipment alarm are associated with each other. Hereinafter, a determination condition associated with a type "maintenance alarm" may be referred to as a determination condition for the maintenance alarm. The determination condition for the maintenance alarm corresponds to a first condition in the present invention. Further, a determination condition associated with a type "equipment alarm" may be referred to as a determination condition for the equipment alarm. The determination condition for the equipment alarm corresponds to a second condition in the present invention.

(Maintenance Alarm)

Note here that the maintenance alarm is an alarm that prompts maintenance of a piece of equipment Mi. The maintenance alarm corresponds to a first alarm in the present invention. Specifically, the maintenance alarm indicates that it is recommended to carry out a maintenance not related to abnormality in the piece of equipment. Examples of the maintenance not related to abnormality in a piece of equipment include, but are not limited to, adjustment and replacement of a component, supply of consumables, and the like. The maintenance alarm serves as a signal to maintain a piece of equipment Mi.

For example, the following are specific examples of the maintenance alarm in a molding machine in a casting facility. A maintenance alarm that indicates that a time of use of a liner has exceeded a threshold is an alarm for prompting inspection or replacement of the liner. A maintenance alarm that indicates that a remaining amount of consumables has become lower than a threshold is an alarm for prompting supply of consumables. A maintenance alarm that indicates that an interval between supplies of oil to a bearing has exceeded a threshold is an alarm for prompting inspection or supply of oil. A maintenance alarm that indicates that a tendency of a load current value of a motor is abnormal is an alarm for prompting inspection or replacement of the motor.

As the determination condition for the maintenance alarm, a condition for determining whether or not a state of the piece of equipment Mi is a state in which maintenance is recommended is set. Examples of the determination condition for the maintenance alarm include, but are not limited to, a condition that an elapsed time of running become greater than a threshold and a condition that a sensor value indicative of a remaining amount of consumables become lower than a threshold. In a case where information indicative of a state of the piece of equipment Mi satisfies the determination condition for the maintenance alarm, the server 20 outputs a maintenance alarm and stores the information in the auxiliary memory 203.

The maintenance alarm can be outputted stepwise according to necessity of maintenance. In other words, the determination condition for the maintenance alarm can be set stepwise according to necessity of maintenance. The number of steps of the maintenance alarm can be one (i.e., no step is set) or more than one.

Further, for example, the maintenance alarm can be outputted at a predetermined point in time regardless of whether or not the determination condition for the maintenance alarm has been satisfied. The predetermined point in time can be, for example, based on a predetermined schedule, periodic, or in accordance with an instruction given by an input action. For example, periodical output of the maintenance alarm can prompt a user to carry out periodic maintenance. Output of the maintenance alarm at a point in time in accordance with an instruction given by an input action can prompt a user to carry out special maintenance.

(Equipment Alarm)

The equipment alarm is an alarm that indicates occurrence of abnormality or a sign of abnormality in a piece of equipment Mi. The equipment alarm corresponds to a second alarm in the present invention. The piece of equipment Mi has a function of stopping itself so as to prevent failure of the piece of equipment Mi, in a case where an event that indicates abnormality occurs in the piece of equipment Mi. The equipment alarm indicates such a stoppage of the piece of equipment Mi (abnormal) or occurrence of an event that can lead to the stoppage (sign). The equipment alarm serves to notify occurrence of abnormality in the piece of equipment Mi or serves to notify a warning at a stage prior to the occurrence of abnormality.

For example, the following are specific examples of the equipment alarm in a molding machine in a casting facility. For example, an equipment alarm that indicates abnormal thermal trip of a motor or a sign of the abnormal thermal trip requires removal of a foreign matter or replacement of the motor. An equipment alarm that indicates an abnormality of an upward end of a cylinder or a sign of the abnormality requires removal of a foreign matter or supply of oil. An equipment alarm that indicates slippage of a belt or a sign of the slippage requires adjustment of a tension of the belt. An equipment alarm that indicates an abnormality in a filter or a sign of the abnormality requires replacement of the filter.

As the determination condition for the equipment alarm, a condition for determining whether or not a state of the piece of equipment Mi indicates an abnormality or a sign of the abnormality is set. Examples of the determination condition for the equipment alarm include, but are not limited to, a condition that a temperature of a predetermined portion of the piece of equipment Mi become greater than (or lower than) a threshold and a condition that a flow rate of a fluid flowing inside the piece of equipment Mi become greater than (or lower than) a threshold. In a case where information indicative of a state of the piece of equipment Mi satisfies the determination condition for the equipment alarm, the server outputs an equipment alarm and stores the information in the auxiliary memory 203.

The equipment alarm can be outputted stepwise according to a possibility of occurrence of abnormality in the piece of equipment. For example, it is assumed that the piece of equipment Mi stops when a physical quantity indicating an abnormality in the piece of equipment Mi exceeds a threshold $a1$. In this case, it is also assumed that a condition that the physical quantity become greater than $a1$ and a condition that the physical quantity become greater than $a2$, which is less than $a1$, are set as the determination condition for the equipment alarm. At this time, an equipment alarm that is outputted when the physical quantity becomes greater than the threshold $a2$ indicates a sign of abnormality in the piece of equipment Mi. An equipment alarm that is outputted when the physical quantity becomes greater than the threshold $a1$ indicates abnormality in the piece of equipment Mi.

The number of steps of the equipment alarm can be one (i.e., no step is set) or more than one.

(Information Stored in Server 20)

The server 20 stores, in the auxiliary memory 203, configuration data pertaining to a configuration of the production line 9, the collection setting data, and the alarm setting data. Details of the collection setting data and the alarm setting data will be discussed later. The following will describe specific examples of the configuration data.

FIG. 4 is a diagram showing an example of the configuration data of the production line 9. The configuration data includes information pertaining to each piece of equipment Mi and information pertaining to each sensor Cj.

Each row shown in (a) of FIG. 4 represents information pertaining to a piece of equipment Mi. The information pertaining to each piece of equipment Mi includes: identification information "equipment name" of the piece of equipment Mi; a network address of a controller Pi included in the piece of equipment Mi; a connection protocol with which the controller Pi is compatible; identification information "component name" of a component of the piece of equipment Mi; and identification information of a relevant file 1 and of a relevant file 2. In the above example, for example, the network address of the controller Pi included in the piece of equipment M1 is "address 1", and the connection protocol with which the controller Pi is compatible is "protocol A". Further, the piece of equipment M1 includes a component A and a component B. A manual A is registered as the relevant file 1 and an appearance image A is registered as the relevant file 2 for the piece of equipment M1.

Each row shown in (b) of FIG. 4 represents information pertaining to a sensor Cj. The information pertaining to each sensor Cj includes: identification information "sensor name" of the sensor Cj; a network address of a sensor base unit CP to which the sensor Cj is connected; and a connection protocol with which the sensor base unit CP is compatible. In the above example, for example, the sensor C1 is connected to a sensor base unit CP having a network address "address 10". A connection protocol with which the sensor base unit CP is compatible is "protocol C".

The configuration data of the production line 9 is not limited to the information shown in (a) and (b) of FIG. 4, and can include other information.

(Hardware Configuration of Terminal 30)

Figure 5:
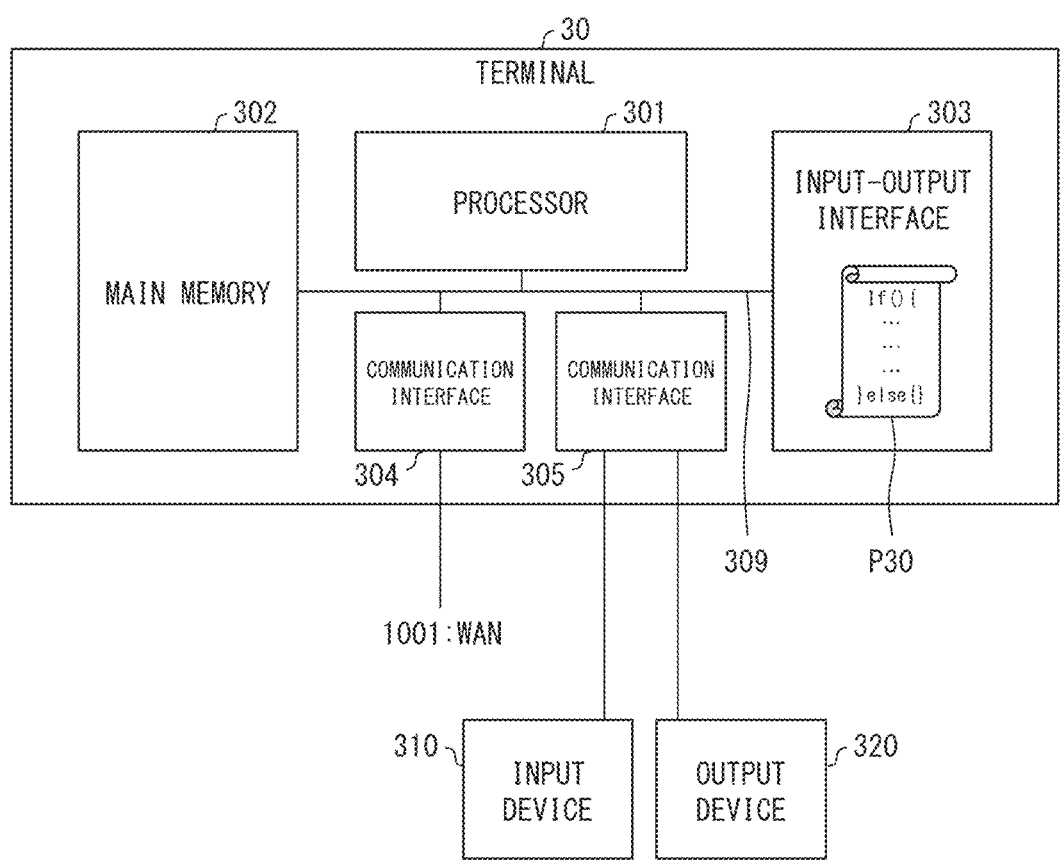
FIG. 5 is a block diagram illustrating a configuration of a terminal in accordance with Embodiment 1 of the present invention.

FIG. 5 is a block diagram illustrating a hardware configuration of the terminal 30. The terminal 30 includes a computer having a processor 301, a main memory 302, an auxiliary memory 303, a communication interface 304, and an input-output interface 305.

The processor 301, the main memory 302, the auxiliary memory 303, the communication interface 304, and the input-output interface 305 are connected to one another via a bus 309. As the processor 301, for example, a single or a plurality of microprocessors, a single or a plurality of digital signal processors, a single or a plurality of microcontrollers, or a combination thereof can be used. As the main memory 302, for example, a single or a plurality of semiconductor RAMs can be used. As the auxiliary memory 303, for example, a single or a plurality of HDDs, a single or a plurality of SSDs, or a combination thereof can be used. Part or all of the auxiliary memory 303 can be a storage on a network which storage is connected via the communication interface 304 or 305. The communication interface 304 is connected to the WAN 1001. As the input-output interface 305, for example, a universal serial bus (USB) interface, an interface for near field wireless communication such as infrared and Bluetooth (registered trademark), or a combination thereof can be used.

An input device 310 and an output device 320 are connected to the input-output interface 305. As the input device 310, for example, a keyboard, a mouse, a touch pad, a microphone, or a combination thereof can be used. As the output device 320, for example, a display, a printer, a speaker, or a combination thereof can be used. For example, like a laptop personal computer, the terminal 30 can include a keyboard and a touch pad functioning as the input device 310 and a display functioning as the output device 320. The terminal 30 can include a touch panel functioning as the input device 310 and the output device 320, like a smartphone, a tablet computer, or the like.

The auxiliary memory 303 stores a program P30 for causing the processor 301 to carry out a process of the terminal 30. The processor 301 causes the program P30 stored in the auxiliary memory 303 to be loaded in the main memory 302 and executes instructions contained in the program P30 loaded in the main memory 302. Further, the auxiliary memory 303 stores various pieces of data to which the processor 301 refers so as to carry out the process of the terminal 30.

Note that the above description has discussed a mode in which the processor 301 operates in accordance with the program P30 stored in the auxiliary memory 303 which is an internal storage medium, but the present invention is not limited to this mode. For example, a mode can be alternatively employed in which the processor 301 operates in accordance with the program P30 stored in an external storage medium. In this case, the external storage medium can be a computer-readable "non-transitory tangible medium" such as a tape, a disk, a card, a semiconductor memory, or a programmable logic circuit. Alternatively, a mode can be employed in which the processor 301 operates in accordance with the program P30 obtained from the network connected via the communication interface 304 or 305.

The above description has discussed a mode in which the terminal 30 is realized using a single computer, but the present invention is not limited to this mode. That is, a mode can be alternatively employed in which the terminal 30 is realized using a plurality of computers configured to be communicable with each other.

(Overview of Functions of Terminal 30)

The terminal 30 has a function of receiving, from the server 20, information in which information indicative of an internal state and information indicative of an external state of a piece of equipment Mi are combined and outputting the information thus received to the output device 320. The terminal 30 also has a function of obtaining, from the input device 310, information for setting the collection setting data and the alarm setting data and transmitting the information to the server 20.

<Flow of Process Carried Out by Information Processing System>

The following description will discuss a flow of a process carried out by the information processing system 1 configured as described above.

(Process of Collecting and Displaying Information Indicative of State of Each Piece of Equipment Mi)

FIG. 6 is a flowchart for explaining a flow of a process in which the information processing system 1 collects information indicative of a state of each piece of equipment Mi and combines and displays the information. In FIG. 6, the left part shows the process S10 of the server, the right part shows the process S20_1 of the gateway, and the dashed arrow connecting the right and left parts indicate flows of data.

In Step S101, the server 20 carries out a process of obtaining the collection setting data. As an example, the collection setting data includes: identification information of information indicative of an internal state and to be received from the controller Pi; and a point in time at which the information is to be received. As another example, the collection setting data includes: identification information of information indicative of an external state and to be received from the sensor Cj; and a point in time at which the information is to be obtained. The point in time at which the information is to be obtained is represented by information indicative of predetermined intervals such as one second intervals or ten second intervals.

The collection setting data is set on the basis of information inputted by a user. For example, the server 20 transmits, to the terminal 30, a setting screen for setting the collection setting data, and the terminal 30 displays the setting screen on a display serving as the output device 320. The terminal 30 transmits, to the server 20, information inputted to the setting screen via the input device 310, and the server 20 obtains the collection setting data on the basis of the information which has been received. Details of specific examples of the collection setting screen and the alarm setting data will be discussed later.

In Step S102, the server 20 transmits the collection setting data to the gateway 10.

In Step S103, the gateway 10 stores, in the auxiliary memory 103, the collection setting data which has been received.

In Step S104, the server 20 transmits, to the gateway information instructing to start collection. The gateway starts collecting information from the controllers Pi and the sensors Cj in accordance with the collection setting data.

In Step S105, the gateway 10 receives, from each controller Pi in accordance with the collection setting data, information obtained by the controller Pi and indicative of an internal state of a piece of equipment Mi. The received information is stored in the auxiliary memory 103 while being associated with time and date of reception. Details of the process of this step will be discussed later.

In Step S106, the gateway 10 receives, via the sensor base unit CP in accordance with the collection setting data, information measured by each controller Pi and indicative of an external state of a piece of equipment Mi. The received information is stored in the auxiliary memory 103 while being associated with time and date of reception. Details of the process of this step will be discussed later.

In Step S107, the gateway 10 determines whether now is a point in time at which the information indicative of the internal state and the information indicative of the external state of each piece of equipment Mi are to be transmitted to the server 20. For example, when a predetermined period (for example, one minute, five minutes, or the like) has passed, the gateway 10 can determine that now is the point in time. For example, when a volume of information stored in the auxiliary memory 103 in Steps S105 and S106 after a previous point in time for transmission has become greater than a predetermined amount, the gateway 10 can determine that now is the timing. Note that when other conditions are satisfied, the gateway 10 can determine that now is the timing. If No in Step S107, the processes from Step S105 are repeated. If Yes in Step S107, a process of the next Step S108 is carried out.

In Step S108, the gateway 10 carries out a process of transmitting, to the server 20, the information indicative of the internal state and the information indicative of the external state of each piece of equipment Mi. The information which is transmitted is information stored in the auxiliary memory 103 in Steps S105 and S106 after the process of this step was carried out last.

In Step S109, the server 20 causes the information indicative of the internal state and the information indicative of the external state of each piece of equipment Mi, each of which has been received from the gateway 10, to be stored in the auxiliary memory 203 while being associated with time and date of reception.

In Step S110, the server 20 carries out a process of combining and outputting, for each piece of equipment Mi, the information indicative of the internal state and the information indicative of the external state stored in the auxiliary memory 203. In so doing, the server 20 can combine, on the basis of time and date of reception, the information indicative of the internal state and the information indicative of the external state stored in the auxiliary memory 203. For example, an example of combining on the basis of time and date of reception can be a process of outputting statistical information of information indicative of an internal state and information indicative of an external state which were received during a predetermined period (e.g., the past one day, the past one week, or the like). Another example can be a process of making a graph in which changes with time are superimposed with respect to a common time axis. Another example can be a process of showing a time-series list. However, examples of combining on the basis of time and date of reception are not limited to the above processes.

Note that the process of Step S110 need not be carried out subsequent to Step S109 each time Step S109 is carried out. Specifically, the process of Step S109 is carried out each time the information indicative of the internal state and the information indicative of the external state of each piece of equipment Mi are received from the gateway 10. This causes the information indicative of the internal state and the information indicative of the external state of each piece of equipment Mi to be accumulated in the auxiliary memory 203. The process of Step S110 is carried out on the basis of the information accumulated in the auxiliary memory 203 at a predetermined point in time. The predetermined point in time can be, for example, predetermined intervals (e.g., every minutes) or the like, a point in time when a request is made by the terminal 30, or a point in time that satisfies other conditions.

In Step S111, the server 20 determines whether or not to stop the collection on the basis of whether or not a condition for stopping the collection has been satisfied. For example, when the server 20 receives, from the terminal 30, information that requests to reset the collection setting data, the server 20 determines that the collection be stopped. For example, when the server 20 receives information that indicates that the production line 9 is not operating, the server 20 determines that the collection be stopped. If No in Step S111, the processes from Step S109 are repeated. If Yes in Step S111, a process of the next Step S112 is carried out. In Step S112, the server 20 transmits, to the gateway information instructing to stop the collection.

In Step S113, the gateway 10 determines whether or not the information instructing to stop the collection has been received. If No in Step S113, the gateway 10 repeats the processes from Step S105. If Yes in Step S113, the gateway repeats the processes from Step S103.

Specific Example of Screen Displayed in Step S101

The following description will discuss, with reference to a specific example, the setting screen of the collection setting data displayed in Step S101. Here, in Step S101, an example will be described in which a setting screen G1 and a setting screen G2 are displayed. The setting screen G1 is a screen that accepts settings related to information indicative of the internal state. The setting screen G2 is a screen that accepts settings related to information indicative of the external state.

In this specific example, each of the information indicative of the internal state and the information indicative of the external state to be collected for the n pieces of equipment Mi is identified by identification information called "tag". Hereinafter, data collected for information identified by a tag is also referred to as collected data of the tag.

(a) of FIG. 7 is a diagram illustrating an example of the setting screen G1. The setting screen G1 includes: fields G101 through G106 in which an equipment name, a tag name, a device name, unit conversion, a unit, and a collection cycle can be entered, respectively; a registration button G112; and a return button G111. Note that the fields G101 through G106 can be provided with input support functions such as a function of displaying a selection list and a function of restricting an input character type.

The field G101 for the equipment name is a UI object in which identification information of any piece of equipment Mi contained in the configuration data of the production line 9 is entered. In Embodiment 1, one controller Pi is included in the piece of equipment Mi. Therefore, when identification information of the piece of equipment Mi is entered, a controller Pi which is to collect information indicative of the internal state is specified.

The field G102 for the tag name is a UI object in which identification information of the information collected from the corresponding piece of equipment Mi is entered.

The field G103 for the device name is a UI object in which identification information of a device for which the corresponding information indicative of the internal state is stored in the controller Pi is entered.

The field G104 for the unit conversion is a UI object in which a conversion rule for converting a unit of information collected from the corresponding device into another unit is entered. The conversion rule is represented by, for example, a formula.

The field G105 for the unit is a UI object in which information indicative of a unit which has been subjected to the unit conversion based on the conversion rule is entered.

The field G106 for the collection cycle is a UI object in which a cycle of collecting the corresponding information indicative of the internal state is entered. For example, the collection cycle can be entered in any of units such as seconds, minutes, and hours.

The setting screen G1 is transmitted to the terminal from the server 20 in response to a request from the terminal 30 and is displayed on the display serving as the output device 320. Information entered in the setting screen G1 with the input device 310 is transmitted from the terminal 30 to the server 20 in response to an action on the registration button G112. The information is then stored in the auxiliary memory 203 as setting data of the information indicative of the internal state. Based on the setting data, collection setting data which is to be transmitted from the server 20 to the gateway 10 is generated. When an action on the return button G111 has been accepted, display of the setting screen G1 terminates without transmission of information entered in the setting screen G1 to the server 20.

(b) of FIG. 7 is a diagram illustrating an example of setting data of information indicative of the internal state stored in the auxiliary memory 203. In this case, for example, information set in association with identification information "tag T11" is as follows. That is, the set information represents that a value stored in a device "data register D01" is collected from a controller P1 included in the piece of equipment M1 in a collection cycle of 30 seconds, and the collected value is subjected to unit conversion based on a formula 1 so as to be expressed in a unit 1. Similar descriptions apply to the tags T12, T13, and T14.

Hereinafter, tags of information indicative of the internal state collected from the controller Pi will be described with reference signs T1$k$ ($k$=1, 2, 3 . . . ).

(a) of FIG. 8 is a diagram illustrating an example of the setting screen G2. The setting screen G2 includes: fields G201 through G206 in which an equipment name, a tag name, a sensor name, unit conversion, a unit, and a collection cycle can be entered, respectively; a registration button G212; and a return button G211. The fields G201 through G206 can be provided with the above described input support functions, as with the setting screen G1.

The fields G201, G202, and G204 through G206 for the equipment name, the tag name, the unit conversion, the unit, and the collection cycle are similar to those of the fields having the same names included in the setting screen G1, and therefore descriptions thereof are omitted.

The field G203 for the sensor name is a UI object in which identification information of any sensor Cj contained in the configuration data of the production line 9 is entered. In Embodiment 1, when the identification information of the piece of equipment Mi and the identification information of the sensor Cj are entered in the setting screen G2, the sensor Cj is registered as accompanying the piece of equipment Mi.

The setting screen G2 is transmitted to the terminal from the server 20 in response to a request from the terminal 30 and is displayed on the display serving as the output device 320. Information entered in the setting screen G2 with the input device 310 is transmitted from the terminal 30 to the server 20 in response to an action on the registration button G212. The information is then stored in the auxiliary memory 203 as setting data of the information indicative of the external state. Based on the setting data, collection setting data which is to be transmitted from the server 20 to the gateway 10 is generated. When an action on the return button G211 has been accepted, display of the setting screen G1 terminates without transmission of information entered in the setting screen G1 to the server 20.

(b) of FIG. 8 is a diagram illustrating an example of setting data of information indicative of the external state stored in the auxiliary memory 203. In this case, for example, it is set that a value measured by a "sensor C1" accompanying the piece of equipment M1 is collected in a collection cycle of 1 second in association with identification information "tag T21", and the collected value is subjected to unit conversion based on a formula 4 so as to be expressed in a unit 4. Similar descriptions apply to the tags T22 and T23. Hereinafter, tags of information indicative of the external state collected from the sensor Cj will be described with reference signs T2$k$ ($k$=1, 2, 3 . . . ).

Specific Example of Information Transmitted in Step S102

FIG. 9 is a diagram illustrating a specific example of collection setting data transmitted from the server 20 to the gateway 10 in Step S102. In FIG. 9, the collection setting data contains pieces of information which are a tag name, a network address, a device name or a sensor name, a connection protocol, unit conversion, and a collection cycle. The collection setting data is generated based on the setting data illustrated in each of (b) of FIG. 7 and (b) of FIG. 8. Here, the setting data illustrated in each of (b) of FIG. 7 and (b) of FIG. 8 contains information necessary for the collection process (e.g., "network address") and information necessary for the display process (e.g., "unit"). With the configuration, the server 20 extracts information necessary for the collection process from the setting data illustrated in each of (b) of FIG. 7 and (b) of FIG. 8 to generate the collection setting data illustrated in FIG. 9, and then transmits the collection setting data to the gateway 10.

For example, the gateway 10 communicates with a controller Pi at an address 1 using a protocol A in accordance with the first line of the collection setting data, and collects the information of the data register D01 every seconds. Then, the gateway 10 causes the collected information, which has been subjected to the unit conversion based on the formula 1, to be stored in the auxiliary memory 103 while being associated with time and date of collection as collected data of the tag T11. Similarly, the gateway 10 causes collected data and time and date of collection of tags T12 through T14 and T21 through T23 to be stored in the auxiliary memory 103. Then, at a predetermined point in time for transmission, the gateway 10 transmits, to the server 20, the collected data and the time and date of collection of the tags T11 through T14 and T21 through T23 stored in the auxiliary memory 103.

(Details of Process in Step S105)

The following description will discuss details of a process in Step S105. FIG. 10 is a flowchart showing a specific example of a detailed flow of a process of collecting information indicative of the internal state in Step S105. In FIG. 10, the left part shows operation of the gateway 10, and the right part shows operation of the controller Pi. The dashed arrows connecting the right and left parts indicate flows of data.

The gateway 10 carries out actions of Steps S131 through S134 for each of tags associated with the network address of the controller Pi in the collection setting data received from the server 20.

In Step S131, the gateway 10 refers to the collection setting data to determine whether it is a collection cycle associated with the corresponding tag. If No in Step S131, the process related to the tag ends. If Yes in Step S131, a process of the next Step S132 is carried out.

In Step S132, the gateway 10 refers to the collection setting data and transmits, to the controller Pi at the corresponding network address, information specifying a device in which information indicative of the internal state of the piece of equipment Mi is stored.

In Step S133, data stored in the specified device is read and transmitted to the gateway 10.

In Step S134, the gateway 10 causes the received information to be stored in the auxiliary memory 103 while being associated with identification information and time and date of collection of the corresponding tag.

After completing the processes of Steps S131 through S134 for each of the corresponding tags, the gateway 10 repeats the processes of Steps S131 through S134 for each of the corresponding tags.

(Details of Process in Step S106)

The following description will discuss details of a process in Step S106. FIG. 11 is a flowchart showing a specific example of a detailed flow of a process of collecting information indicative of the external state in Step S106. In FIG. 11, the left part shows operation of the gateway 10, the middle part shows operation of the sensor base unit CP, and the right part shows operation of the sensor. The dashed arrows connecting the right and left parts indicate flows of data.

The gateway 10 carries out actions of Steps S141 through S146 for each of tags associated with the network address of the sensor base unit CP in the collection setting data received from the server 20.

In Step S141, the gateway 10 refers to the collection setting data to determine whether it is a collection cycle associated with the corresponding tag. If No in Step S141, the process related to the tag ends. If Yes in Step S141, a process of the next Step S142 is carried out.

In Step S142, the gateway 10 requests, from the sensor base unit CP, information measured by a sensor Cj indicated by the corresponding tag as information indicative of the external state of the piece of equipment Mi.

In Step S143, the sensor base unit CP requests the measured information from the sensor Cj which relates to said request. The process of this step is carried out in a case where the corresponding sensor Cj is of a type which transmits measured information in response to a request from the sensor base unit CP. In a case where the corresponding sensor Cj is of a type which measures information and transmits the information to the sensor base unit CP in a predetermined cycle or of a type which transmits measured information to the sensor base unit CP if the information satisfies a predetermined condition, the process of this step is omitted.

In Step S144, the corresponding sensor Cj transmits the measured information to the sensor base unit CP. The process of this step is carried out in response to the request in Step S143 in a case where the corresponding sensor Cj is of a type which transmits measured information in response to a request from the sensor base unit CP. In a case where the corresponding sensor Cj is of a type which measures information and transmits the information to the sensor base unit CP in a predetermined cycle or of a type which transmits measured information to the sensor base unit CP if the information satisfies a predetermined condition, the process of this step is carried out when necessary at a corresponding point in time. In this case, the measured information is accumulated in a memory of the sensor base unit CP.

In Step S145, the sensor base unit CP transmits the information measured by the sensor Cj to the gateway 10.

In Step S146, the gateway 10 causes the received information to be stored in the auxiliary memory 103 while being associated with identification information and time and date of collection of the corresponding tag.

After completing the processes of Steps S141 through S146 for each of the corresponding tags, the gateway 10 repeats the processes of Steps S141 through S146 for each of the corresponding tags.

Specific Example of Screen Displayed in Step S110

The following description will discuss a specific example of a screen displayed on the display serving as the output device 320 in Step S110. Each of FIGS. 12 through 16 shows a specific example of a screen in which information indicative of the internal state and information indicative of the external state are combined together for each piece of equipment Mi. Hereinafter, information obtained by combining the information indicative of the internal state and the information indicative of the external state is simply referred to as "combined information".

(Main Screen)

FIG. 12 is a diagram illustrating a main screen G3 which includes combined information for each of a plurality of pieces of equipment Mi. Through the main screen G3, the user can look through pieces of combined information for the respective plurality of pieces of equipment Mi.

In FIG. 12, the main screen G3 includes an area G301a, an area G301b, an area G301c, and an area G301d. The area G301a contains combined information pertaining to the piece of equipment M1. The area G301b contains combined information pertaining to the piece of equipment M2. The area G301c contains combined information pertaining to the piece of equipment M3. The area G301d contains combined information pertaining to the piece of equipment M4.

The area G301a include a tag area G302a, an operating state area G303a, an equipment alarm area G304a, a maintenance alarm area G305a, and a button G306a. The areas G301b through G301d include tag areas G302b through G302d, operating state areas G303b through G303d, equipment alarm areas G304b through G304d, maintenance alarm areas G305b through G305d, and buttons G306b through G306d, respectively, as with the area G301a. Hereinafter, in cases where it is not particularly necessary to distinguish the reference signs G301 through G306 to which any of a to d is attached as a suffix letter, the reference signs will be simply referred to as G301 through G306.

The tag area G302 is an area in which collected data of any of tags collected for the corresponding piece of equipment Mi is displayed. In this example, for example, the tag area G302a displays collected data which is 67.8 (° C.) for the tag T11. That is, the tag displayed in the tag area G302 is a tag representing information indicative of the internal state or a tag representing information indicative of the external state of the piece of equipment Mi.

Moreover, the tag area G302 includes the button G306 for selecting other tags. In response to an action on the button G306, collected data of another tag collected for the corresponding piece of equipment Mi is displayed. In this example, for example, an action on the button G306d for the piece of equipment M4 is accepted, and accordingly a selection list of tags collected for the piece of equipment M4 is displayed. In response to an action on the selection list, display content in the tag area G302d is changed to collected data of a selected tag.

The operating state area G303 is an area in which an operating state of the corresponding piece of equipment Mi is displayed. The operating state is displayed based on a history of tags which have been collected for the piece of equipment Mi and indicate the operating state of the piece of equipment Mi. In this example, the collected data of the tag indicating the operating state of the piece of equipment Mi indicates any of "operation", "standby", "abnormal", and "stop". The tags indicating the operating state are information indicative of the internal state collected from the controller Pi. The operating state area G303 includes an indication of proportions of the respective operating states. The proportion of each of the operating states can be a ratio with respect to a total operating time in a predetermined period. The predetermined period can be, but not limited to, one day, one week, one month, or the like.

The equipment alarm area G304 is an area in which a tendency of generation of the equipment alarm is displayed. The tendency of generation is represented by the number of times that collected data of one or more tags indicating the state of the corresponding piece of equipment Mi has satisfied the determination condition of the equipment alarm. That is, the tendency of generation is represented by information which is the numbers of generations of the equipment alarm summed for each degree of urgency. The numbers of times that are summed can be reset to initial values at a predetermined point in time. The predetermined point in time can be, but not limited to, the beginning of a day, a week, a month, or the like. The tendency of generation is not limited to the number of generations, and can be represented by other information such as an occurrence ratio of each degree of urgency. The tendency of generation can be graphically represented by a graph or the like.

In a case where most recently collected data of any of the tags satisfies the determination condition of equipment alarm for the corresponding piece of equipment Mi, the equipment alarm area G304 includes information indicating that the equipment alarm is being generated. In this example, for the tag T24 indicating the external state of the piece of equipment M2, the equipment alarm area G304b for the piece of equipment M2 indicates that the equipment alarm is being generated at a degree of urgency "warning". This indicates that most recently collected data of the tag T24 satisfies the determination condition of the degree of urgency "warning" in the equipment alarm set for the tag T24.

Details of the maintenance alarm area G305 can be similarly described by reading the equipment alarm as the maintenance alarm in the descriptions of the equipment alarm area G304. In this example, each of the maintenance alarm areas G305a, 305b, and 305d of the respective pieces of equipment M1, M2, and M4 displays a summed number of generations of the maintenance alarm for each degree of urgency. For the tag T19 indicating the internal state of the piece of equipment M3, the maintenance alarm area G305c for the piece of equipment M3 indicates that the maintenance alarm is being generated at a degree of urgency "danger".

Thus, the tag area G302 in the main screen G3 displays collected data of the tag representing the information indicative of the internal state or the tag representing the information indicative of the external state of the piece of equipment Mi. In the equipment alarm area G304, the tendency of generation is displayed in which the numbers of times that the determination condition of the equipment alarm has been satisfied for the tag indicative of the internal state and the tag indicative of the external state of the piece of equipment Mi are integrated for each degree of urgency. The same applies to the maintenance alarm area G305.

As such, each of the equipment alarm area G304 and the maintenance alarm area G305 includes the following information as an example of information obtained by "combining the information indicative of the internal state and the information indicative of the external state" in the present invention. This information indicates the sum of (i) the number of times that the internal state has become an "abnormal" (or "warning" or "caution") state and (ii) the number of times that the external state has become an "abnormal" (or "warning" or "caution") state.

In addition, each of the equipment alarm area G304 and the maintenance alarm area G305 includes information indicating the above described sum as an example of "information in which alarms are combined for a piece of equipment" in the present invention.

The maintenance alarm area G305 includes the sum of the numbers of times that the maintenance alarm has been outputted, as an example of the "tendency in which the first alarm is outputted" in the present invention. The equipment alarm area G304 includes the sum of the numbers of times that the equipment alarm has been outputted, as an example of the "tendency in which the second alarm is outputted" in the present invention.

(Graphic Monitor Screen)

FIG. 13 is a diagram illustrating a graphic monitor screen G4 which contains combined information pertaining to the piece of equipment M1. Through the graphic monitor screen G4, the user can collectively grasp positions where the information indicative of the internal state and the information indicative of the external state, which have been collected for any piece of equipment Mi, have been obtained in a physical structure of the piece of equipment Mi.

In FIG. 13, the graphic monitor screen G4 includes a selection button G401, an image G402, and tag labels G405a through G405d. Hereinafter, in cases where it is not necessary to distinguish the tag labels G405a through G405d, the tag label is simply referred to as "tag label G405".

The image G402 is an appearance image of the piece of equipment M1. The appearance image is registered in the configuration data shown in FIG. 4.

The tag label G405 is a label representing collected data of a tag for the piece of equipment M1. The tag label G405 is displayed while being superimposed on the image G402. A display position of the tag label G405 on the image G402 is stored in the auxiliary memory 203 in advance while being associated with the tag represented by the tag label G405.

The selection button G401 is used to select a piece of equipment Mi to be displayed on the graphic monitor screen G4. In response to an action on the selection button G401, a list of the pieces of equipment M1 through Mn is displayed as a selection list. In response to an action on the selection list, display content on the graphic monitor screen G4 is changed to display content corresponding to the selected piece of equipment Mi.

Thus, the graphic monitor screen G4 includes the tag labels G405a through G405d which represent the tags T11 and T12 corresponding to the information indicative of the internal state of the piece of equipment M1 and the tags T21 and T22 corresponding to the information indicative of the external state of the piece of equipment M1, respectively. That is, the graphic monitor screen G4 contains information obtained by combining the information indicative of the internal state and the information indicative of the external state of the piece of equipment Mi.

(Measured Value Monitor Screen)

FIG. 14 is a diagram illustrating a measured value monitor screen G5 which contains combined information pertaining to the piece of equipment M1. Through the measured value monitor screen G5, the user can grasp a history of the information indicative of the internal state and the information indicative of the external state which have been collected for any piece of equipment Mi.

In FIG. 14, the measured value monitor screen G5 includes a selection button G501 and a table G502.

The table G502 indicates a history of collected data of the tags T11, T12, T21, and T22 for the piece of equipment M1. The selection button G501 is used to select a piece of equipment Mi to be displayed on the measured value monitor screen G5. Details of the selection button G501 are similar to those of the selection button G401 described above, and therefore detailed descriptions thereof will not be repeated.

Thus, the measured value monitor screen G5 includes the history of the tags T11 and T12 representing the information indicative of the internal state of the piece of equipment M1 and the tags T21 and T22 representing the information indicative of the external state of the piece of equipment M1. That is, the measured value monitor screen G5 contains information obtained by combining the information indicative of the internal state and the information indicative of the external state of the piece of equipment M1.

(Graph Monitor Screen)

FIG. 15 is a diagram illustrating a graph monitor screen G6 which contains combined information pertaining to the piece of equipment M1. Through the graph monitor screen G6, the user can graphically grasp change of the information indicative of the internal state and the information indicative of the external state which have been collected for any piece of equipment Mi.

In FIG. 15, the graph monitor screen G6 includes a selection button G601, a graph area G602, and a data selection button G606.

The graph area G602 includes a graph showing change in values of the tags T11, T21, and T22 for the piece of equipment M1. The horizontal axis of the graph represents passage of time.

The data selection button G606 is used to select a tag to be displayed in the graph area G602. When the data selection button G606 is operated, a list of tags for the piece of equipment M1 is displayed as a selection list. In the selection list, one or more tags can be selected. In response to an action on the selection list, the graph of the tags T11, T21, and T22 displayed in the graph area G602 is changed to a graph of a selected tag(s).

The selection button G601 is used to select a piece of equipment Mi to be displayed on the graph monitor screen G6. Details of the selection button G601 are similar to those of the selection button G401 described above, and therefore detailed descriptions thereof will not be repeated.

Thus, the graph monitor screen G6 includes the graph indicating change of the tag T11 representing the information indicative of the internal state of the piece of equipment M1 and the tags T21 and T22 representing the information indicative of the external state of the piece of equipment M1. That is, the graph monitor screen G6 contains information obtained by combining the information indicative of the internal state and the information indicative of the external state of the piece of equipment M1.

(Operation Monitor Screen)

FIG. 16 is a diagram illustrating an operation monitor screen G7 which includes information indicating the operating status of the piece of equipment M1. Through the operation monitor screen G7, the user can graphically grasp a history of operating statuses of any piece of equipment Mi.

In FIG. 16, the operation monitor screen G7 includes a selection button G701 and an operating status area G706.

The operating status area G706 includes a bar graph representing daily operating statuses of the piece of equipment M1. The bar graph shows proportions of the operating statuses "operation", "abnormal", "standby" and "stop" for the corresponding date. The selection button G701 is used to select a piece of equipment Mi to be displayed on the operation monitor screen G7. Details of the selection button G701 are similar to those of the selection button G401 described above, and therefore detailed descriptions thereof will not be repeated.

(Process of Outputting Tendency of Generation of Alarm)

FIG. 17 is a flowchart for explaining a flow of the process S20_2 in which the server 20 causes the tendencies of generation of the maintenance alarm and the equipment alarm to be displayed.

In Step S201, the server 20 obtains alarm setting data based on information inputted by the user with the input device 310. The alarm setting data includes an alarm rule in which a determination condition for determining a state of a piece of equipment is associated with a type that indicates either the maintenance alarm or the equipment alarm. The alarm setting data is stored in the auxiliary memory 203.

As an example, the determination condition can be, but not limited to, a condition in which collected data is not lower than a threshold, collected data is not greater than the threshold, collected data has been changed from ON to OFF, collected data has been changed from OFF to ON, or the like. The determination condition can further include a condition in which the number of consecutive determinations that the condition has been satisfied exceeds a threshold.

In Step S202, the server 20 receives, from the gateway collected data of one or both of the information indicative of the internal state and the information indicative of the external state of each piece of equipment Mi. The process of this step is carried out in response to the transmitting process from the gateway 10 in Step S108 shown in FIG. 6.

In Step S203, the server 20 refers to the alarm setting data and determines whether or not any collected data which has been received satisfies the determination condition of the maintenance alarm. If No in Step S203, the process of Step S205 described later is carried out. If Yes in Step S203, the process of the next Step S204 is carried out.

In Step S204, the server 20 outputs the maintenance alarm. The maintenance alarm includes, for example, a tag name, collected data that satisfies the determination condition, and content of the determination condition. The server 20 causes the auxiliary memory 203 to store the maintenance alarm in association with the time and date of collection.

In Step S205, the server 20 refers to the alarm setting data and determines whether or not any collected data which has been received satisfies the determination condition of the equipment alarm. If No in Step S205, the process of Step S207 described later is carried out. If Yes in Step S205, the process of the next Step S206 is carried out.

In Step S206, the server 20 outputs the equipment alarm. The equipment alarm includes, for example, a tag name, collected data that satisfies the determination condition, and content of the determination condition. The server 20 causes the auxiliary memory 203 to store the equipment alarm in association with the time and date of collection.

In Step S207, the server 20 outputs, based on the maintenance alarm and the equipment alarm stored in the auxiliary memory 203, a tendency of generation of the maintenance alarm and a tendency of generation of the equipment alarm in a distinguishably recognizable manner for each piece of equipment Mi.

Specific Example of Screen Displayed in Step S201

FIG. 18 is a diagram illustrating a specific example of a setting screen G8 displayed on the display serving as the output device 320 in Step S201. The setting screen G8 accepts an input action for setting an alarm rule for a piece of equipment Mi. The setting screen G8 includes: fields G801 and G802 in which an equipment name and a tag name can be entered, respectively; a region G803 for setting a rule type; regions G804a through G804c for setting a determination condition; a registration button G812; and a return button G811. In this example, up to three determination conditions can be set for one tag, i.e., one type of information indicative of the internal state or the external state of each piece of equipment Mi. However, the number of determination conditions that can be set for each tag can be 1 or 2, or can be 4 or more.

The field G801 for the equipment name is a UI object in which identification information of any piece of equipment Mi contained in the configuration data of the production line 9 is entered.

The field G802 for the tag name is a UI object in which any tag name contained in the collection setting data is entered.

The region G803 for setting the rule type includes: a set of radio buttons G803a for selecting a rule type; and a field G803b in which a component name can be entered.

The set of radio buttons G803a is a UI object for selecting one of the equipment alarm and the maintenance alarm.

The field G803b for the component name is a UI object in which, when the maintenance alarm is selected as the rule type, a component name relating to the maintenance alarm is entered. The component name to be entered is a component name which has been registered as a component of the corresponding piece of equipment Mi in the configuration data of the production line 9.

In the region G804a for setting the determination condition, a first determination condition No. 1 for the corresponding tag is set. The region G804a for setting the determination condition includes: fields G805a and G806a in which a condition and the number of consecutive occurrences can be entered, respectively; and drop-down lists G807a and G808a with which a degree of urgency and an operation can be selected, respectively.

The field G805a for the condition is a UI object in which a condition for collected data of the corresponding tag is entered. For example, in a case where the collected data of the tag can take consecutive values, a condition (such as being not lower than a threshold or being not greater than the threshold) can be entered in the field G805a. In a case where the collected data of the tag is in binary form such as ON or OFF, a condition such as change from ON to OFF or change from OFF to ON can be entered in the field G805a. However, the information to be entered in the field G805a is not limited to the above information.

The field G806a for the number of consecutive occurrences is a UI object in which a threshold of the number of times that the condition entered in the field G805a is consecutively satisfied (hereinafter also referred to as "the number of consecutive occurrences") is entered. Note that the determination condition of each alarm rule is determined by the server 20 at a predetermined point in time. The predetermined point in time can be, for example, a point in time at which collected data of each tag is received by the server 20, or can be predetermined intervals.

The drop-down list G807a for the degree of urgency is a UI object for selecting a degree of urgency of the corresponding determination condition. In Embodiment 1, as shown in FIG. 18, there are three options, i.e., "danger", "warning", and "caution" when the maintenance alarm is selected as the rule type. Moreover, there are three options, i.e., "abnormal", "warning", and "caution" when the equipment alarm is selected as the rule type.

The drop-down list G808a for the operation is a UI object for selecting a notification operation when the number of times that the condition has been satisfied is equal to or greater than the number of consecutive occurrences. In Embodiment 1, as shown in FIG. 18, there are two operation options, i.e., "email notification" and "display on main screen". Note that it is possible to employ a configuration in which, in a case where the email notification has been selected, a list of notification destinations registered in advance (not illustrated) is displayed so that a notification destination is selected.

In the region G804b for setting the determination condition, a second determination condition No. 2 for the corresponding tag is set. In the region G804c for setting the determination condition, a third determination condition No. 3 for the corresponding tag name is set. Details of the regions G804b and G804c for setting the determination conditions are similar to those of the region G804a, and therefore descriptions thereof will not be repeated.

The registration button G812 and the return button G811 are similar to the registration button G112 and the return button G111 described with (a) of FIG. 7, and therefore descriptions thereof will not be repeated.

Note that the fields included in the setting screen G8 can be provided with input support functions such as of displaying a selection list and of restricting an input character type.

FIG. 19 is a diagram illustrating an example of alarm setting data stored in the auxiliary memory 203 based on input actions on the setting screen G8. In this example, for example, determination conditions No. 1 through No. 3 of a rule type "equipment alarm" are set for the "tag T11" that identifies information indicative of the internal state of the piece of equipment M1. Further, it is assumed that collected data received as the "tag T11" is numerical values that can take consecutive values. The determination condition No. 3 of the tag T11 represents that, in a case where collected data of the tag T11 has been determined to be 100 or more twice consecutively, the equipment alarm at the degree of urgency "caution", which indicates a sign of abnormality in the piece of equipment M1, is displayed on the main screen. The determination condition No. 2 of the tag T11 represents that, in a case where collected data of the tag T11 has been determined to be 130 or more three times consecutively, the equipment alarm at the degree of urgency "warning", which indicates a sign of a higher possibility of abnormality that would occur in the piece of equipment M1, is notified to a person a in charge by email. The determination condition No. 1 of the tag T11 represents that, in a case where collected data of the tag T11 has been determined to be 150 or more five times consecutively, the equipment alarm at the degree of urgency "abnormal", which indicates that an abnormality has occurred in the piece of equipment M1, is notified to the person a in charge and a client b by email.

Moreover, for example, determination conditions No. 1 through No. 3 of a rule type "maintenance alarm" are set for the "tag T21" which is information indicative of the external state of the piece of equipment M1. Further, it is assumed that collected data received as the "tag T21" is numerical values that can take consecutive values. The determination condition No. 3 of the tag T21 represents that, in a case where collected data of the tag T21 has been determined to be 35 or less, the maintenance alarm at the degree of urgency "caution" at which maintenance is recommended is displayed on the main screen. The determination condition No. 2 of the tag T21 represents that, in a case where collected data of the tag T21 has been determined to be 30 or less, the maintenance alarm at the degree of urgency "warning", at which necessity of maintenance is higher than "caution", is notified to a person c in charge by email. The determination condition No. 1 of the tag T21 represents that, in a case where collected data of the tag T21 has been determined to be 25 or less, the maintenance alarm at the degree of urgency "danger", at which necessity of maintenance is higher than "warning", is notified to the person c in charge and a client d by email.

Moreover, for example, determination conditions No. 1 through No. 3 of the rule type "equipment alarm" are set for the "tag T12" which is information indicative of the internal state of the piece of equipment M1. Further, it is assumed that collected data received as the "tag T12" is in binary form, i.e., ON or OFF. The determination condition No. 3 of the tag T12 represents that, in a case where collected data of the tag T12 has been determined to be changed from ON to OFF twice consecutively, the equipment alarm at the degree of urgency "caution", which indicates a sign of abnormality in the piece of equipment M1, is displayed on the main screen. The determination condition No. 2 of the tag T12 represents that, in a case where collected data of the tag T12 has been determined to be changed from ON to OFF three times consecutively, the equipment alarm at the degree of urgency "warning", which indicates a sign of a higher possibility (than "caution") of an abnormality that would occur in the piece of equipment M1, is notified to the person a in charge by email. The determination condition No. 1 of the tag T12 represents that, in a case where collected data of the tag T12 has been determined to be changed from ON to OFF five times consecutively, the equipment alarm at the degree of urgency "abnormal", which indicates that an abnormality has occurred in the piece of equipment M1, is notified to the person a in charge and the client b by email.

Note that, in a case where a plurality of determination conditions are set for each tag, it is possible that determinations based on determination conditions No. 1 through No. 3 are carried out in this order and, when any of the determination conditions has been satisfied, determination(s) based on the subsequent determination condition(s) is not carried out. The number of consecutive determinations is reset to an initial value (e.g., 0) when it is determined that the determination condition is not satisfied. Moreover, the number of consecutive determinations is also reset to the initial value when a determination condition, which is earlier in order of determination than the corresponding determination condition, is satisfied for the same tag.

FIG. 20 is a diagram illustrating a further specific example of the alarm setting data shown in FIG. 19. Here, pieces of alarm setting data rule1 through rule10 will be described in which determination conditions of the maintenance alarm and the equipment alarm are set for molding machines which form molds in a casting facility which is the production facility and for shotblasting machines which process surfaces of the molds.

The alarm setting data rule1 contains stepwise determination conditions No. 1 through No. 3 of the rule type "equipment alarm" for a tag "abnormality in frame setting" which identifies information indicative of an internal state of a "molding machine A" which is one of the pieces of equipment Mi. Collected data received for the tag is an amount of misalignment that occurs between a cope and a drag. The amount of misalignment can be obtained by a controller Pi of the "molding machine A". In a case where a misalignment between the cope and the drag is large, defects would occur in a casting which is a product. Therefore, in a case where the amount of misalignment is equal to or greater than a threshold, the "molding machine A" stops.

The determination condition No. 3 of the tag "abnormality in frame setting" represents that, in a case where the amount of misalignment has been determined to be 2 millimeters or more, the equipment alarm at the degree of urgency "caution", which indicates a sign of abnormality in relation to the amount of misalignment, is displayed on the main screen. The determination condition No. 2 represents that, in a case where the amount of misalignment has been determined to be 3 millimeters or more, the equipment alarm at the degree of urgency "warning", which indicates that the "molding machine A" is more likely to stop due to an abnormal amount of misalignment, is notified to a person a in charge by email. The determination condition No. 1 represents that, in a case where the amount of misalignment has been determined to be 5 millimeters or more, the equipment alarm at the degree of urgency "abnormal", which indicates that the "molding machine A" has stopped due to an abnormal amount of misalignment, is displayed on the main screen and is notified to the person a in charge and the client b by email.

The alarm setting data rule2 contains stepwise determination conditions No. 1 through No. 3 of the rule type "equipment alarm" for a tag "hydraulic operating pressure decrease" which identifies information indicative of the internal state of the "molding machine A". Collected data received for the tag is a hydraulic pressure of a hydraulic pump. The hydraulic pressure can be obtained by the controller Pi of the "molding machine A". In a case where the hydraulic pressure is low, an operating pressure of the hydraulic pump decreases and strength of a mold becomes insufficient, and this leads to molding failure. For this reason, the "molding machine A" stops when the hydraulic pressure becomes equal to or lower than a threshold.

In determination conditions No. 1 through No. 3 of the tag "hydraulic operating pressure decrease", determination conditions of the hydraulic pressure are set to 5 megapascals or less, 6 megapascals or less, and 7 megapascals or less, respectively. The equipment alarm outputted stepwise when the determination conditions No. 1 through No. 3 are satisfied can be described in a manner similar to that for the alarm setting data rule1, and therefore detailed descriptions thereof will not be repeated.

The alarm setting data rule3 contains stepwise determination conditions No. 1 through No. 3 of the rule type "equipment alarm" for a tag "oil level abnormal decrease" which identifies information indicative of the internal state of the "molding machine A". Collected data received for the tag "hydraulic pressure abnormal decrease" is an amount of oil of an oil seal valve. The amount of oil can be obtained by the controller Pi of the "molding machine A". In a case where the amount of oil decreases, a decrease in operating pressure of the hydraulic pump is caused, and consequently strength of a mold becomes insufficient, and this leads to molding failure. For this reason, the "molding machine A" stops when the amount of oil becomes equal to or lower than a threshold.

In determination conditions No. 1 through No. 3 of the tag "oil level abnormal decrease", determination conditions of the amount of oil are set to 80 liters or less, 85 liters or less, and 90 liters or less, respectively. The equipment alarm outputted stepwise when the determination conditions No. 1 through No. 3 are satisfied can be described in a manner similar to that for the alarm setting data rule1, and therefore detailed descriptions thereof will not be repeated.

The alarm setting data rule4 contains a determination condition No. 1 of the rule type "equipment alarm" for a tag "abnormal thermal trip in motor" which identifies information indicative of the internal state of the "shotblasting machine B" which is one of the pieces of equipment Mi. Collected data received for the tag is a load current value of a motor for rotating an impeller of a projecting device. The current value can be obtained by a controller Pi of the "shotblasting machine B". A higher current value leads to burnout failure of the motor. For this reason, the "shotblasting machine B" stops when the current value becomes equal to or greater than a threshold.

The determination condition No. 1 of the tag "abnormal thermal trip in motor" represents that, in a case where the current value has been determined to be 15 amperes or more, the equipment alarm at the degree of urgency "abnormal", which indicates that the "shotblasting machine B" has stopped due to abnormal thermal trip in the motor, is notified to the person a in charge and the client b by email. In this example, the equipment alarm for the tag "abnormal thermal trip in motor" is not outputted at a stage prior to occurrence of the abnormality but is outputted at a stage at which the abnormality has occurred. Note that the equipment alarm for the tag can be outputted stepwise.

The alarm setting data rule5 contains a determination condition No. 1 of the rule type "maintenance alarm" for a tag "excessive time of use of liner" which identifies information indicative of the internal state of the "shotblasting machine B". Collected data received for the tag is a time of use of the liner. The time of use can be obtained by the controller Pi of the "shotblasting machine B". In a case where the time of use of the liner is long, the liner is perforated and a hole is formed in a main body. In addition, other parts are also damaged due to abnormal vibration, insufficient strength, and the like. Therefore, it is recommended that the liner be replaced in a case where the time of use of the liner becomes equal to or greater than a threshold.

The determination condition No. 1 of the tag "excessive time of use of liner" represents that, in a case where the time of use has been determined to be 500 hours or more, the maintenance alarm at the degree of urgency "warning", which indicates that necessity of replacing the liner is high, is notified to the person a in charge and the client b by email. In this example, the maintenance alarm for the tag "excessive time of use of liner" is not outputted stepwise but can be set to be outputted stepwise.

The alarm setting data rule6 contains a determination condition No. 1 of the rule type "maintenance alarm" for a tag "detection of lower limit of consumables" which identifies information indicative of the internal state of the "shotblasting machine B". Collected data received for the tag "detection of lower limit of consumables" is a load current value of a motor for rotating an impeller of a projecting device. The current value can be obtained by the controller Pi of the "shotblasting machine B". The current value becomes higher as an amount of shot material increases, and becomes lower as the amount of shot material decreases. If the shot material is deficient, effectiveness of treatment is lowered. Therefore, it is recommended to supply the shot material when the current value becomes equal to or lower than a threshold.

The determination condition No. 1 of the tag "detection of lower limit of consumables" represents that, in a case where the current value has been determined to be 25.8 amperes or less, the maintenance alarm at the degree of urgency "warning", which indicates that necessity of supplying the shot material is high, is notified to the person a in charge and the client b by email. In this example, the maintenance alarm for the tag "detection of lower limit of consumables" is not outputted stepwise but can be set to be outputted stepwise.

The alarm setting data rule7 contains a determination condition No. 1 of the rule type "maintenance alarm" for a tag "excessive interval between supplies of oil to bearing" which identifies information indicative of the internal state of the "shotblasting machine B". Collected data received for the tag "excessive interval between supplies of oil to bearing" is an elapsed time from when the bearing was greased. The elapsed time can be obtained by the controller Pi of the "shotblasting machine B". If the elapsed time becomes equal to or greater than a threshold, friction of the bearing increases, and a component life is reduced due to wear or heat generation. Therefore, it is recommended that the bearing be replaced in a case where the elapsed time becomes equal to or greater than the threshold.

The determination condition No. 1 of the tag "excessive interval between supplies of oil to bearing" represents that, in a case where the interval has been determined to be 350 hours or more, the maintenance alarm at the degree of urgency "warning", which indicates that necessity of replacing the bearing is high, is notified to the person a in charge and the client b by email. In this example, the maintenance alarm for the tag "excessive interval between supplies of oil to bearing" is not outputted stepwise but can be set to be outputted stepwise.

The alarm setting data rule8 contains a determination condition No. 1 of the rule type "equipment alarm" for a tag "abnormal upward end of cylinder" which identifies information indicative of the internal state of a "molding machine C" which is one of the pieces of equipment Mi. Collected data received for the tag "abnormal upward end of cylinder" is an ON/OFF value of an automatic switch that is turned off when abnormal elevation of the cylinder has been detected. The ON/OFF value can be obtained by a controller Pi of the "molding machine C". If the abnormal elevation of the cylinder is detected, the machine malfunctions, and this leads to molding failure. Therefore, when the automatic switch has been turned off, the "molding machine C" stops.

The determination condition No. 1 of the tag "abnormal upward end of cylinder" represents that, in a case where it has been determined that the ON/OFF value had changed from ON to OFF, the equipment alarm at the degree of urgency "abnormal", which indicates that the "molding machine C" has stopped due to an abnormality of an upward end of the cylinder, is notified to the person a in charge and the client b by email. In this example, the equipment alarm for the tag "abnormal upward end of cylinder" is not outputted stepwise but can be set to be outputted stepwise.

The alarm setting data rule9 contains a determination condition No. 1 of the rule type "equipment alarm" for a tag "abnormality in aeration pressure sensor" which identifies information indicative of the internal state of the "molding machine C". Collected data received for the tag "abnormality in aeration pressure sensor" is a pressure sensor value of aeration. The pressure sensor value can be obtained by the controller Pi of the "molding machine C". If a state in which the pressure sensor value is obtained (ON) is changed to a state in which the pressure sensor value cannot be obtained (OFF), strength of a mold becomes insufficient and this leads to molding failure, and in order to avoid such a case, the "molding machine C" stops.

The determination condition No. 1 of the tag "abnormality in aeration pressure sensor" represents that, in a case where it has been determined that the pressure sensor value had changed from ON to OFF, the equipment alarm at the degree of urgency "abnormal", which indicates that the "molding machine C" has stopped, is notified to the person a in charge and the client b by email. In this example, the equipment alarm for the tag "abnormality in aeration pressure sensor" is not outputted stepwise but can be set to be outputted stepwise.

The alarm setting data rule10 contains a determination condition No. 1 of the rule type "equipment alarm" for a tag "abnormality in squeeze board CY encoder" which identifies information indicative of the internal state of the "molding machine C". Collected data received for the tag is an output value from an encoder. The output value from the encoder can be obtained by the controller Pi of the "molding machine C". If a state in which the output value from the encoder is obtained (ON) is changed to a state in which the output value from the encoder cannot be obtained (OFF), sand in a tank cannot be weighed and this leads to molding failure, and therefore the "molding machine C" stops.

The determination condition No. 1 of the tag "abnormality in squeeze board CY encoder" represents that, in a case where it has been determined that the output value from the encoder had changed from ON to OFF, the equipment alarm at the degree of urgency "abnormal", which indicates that the "molding machine C" has stopped due to an abnormality in a squeeze board CY encoder, is notified to the person a in charge and the client b by email. In this example, the equipment alarm for the tag "abnormality in squeeze board CY encoder" is not outputted stepwise but can be set to be outputted stepwise.

Specific Example of Screen Displayed in Steps S204 and S206

Here, the following description will discuss a specific example of screens displayed on the display serving as the output device 320 in Steps S204 and S206. In the main screen G3 shown in FIG. 12, as described above, in a case where the equipment alarm is being generated, the equipment alarm area G304 indicates that the equipment alarm is being generated. That is, the process of outputting the equipment alarm in Step S206 is carried out. In a case where the maintenance alarm is being generated, the maintenance alarm area G305 indicates that the maintenance alarm is being generated. That is, the process of outputting the maintenance alarm in Step S204 is carried out.

Specific Example of Screen Displayed in Step S207

Here, the following description will discuss a specific example of a screen displayed on the display serving as the output device 320 in Step S207.

(Main Screen)

The main screen G3 shown in FIG. 12 includes the equipment alarm area G304 and the maintenance alarm area G305 for each of the pieces of equipment M1 through M4. The equipment alarm area G304 contains, as a tendency of generation of the equipment alarm, the number of times that the equipment alarm has been generated for each degree of urgency, or information pertaining to the equipment alarm which is currently generated. The maintenance alarm area G305 contains, as a tendency of generation of the maintenance alarm, the number of times that the maintenance alarm has been generated for each degree of urgency, or a state pertaining to the maintenance alarm which is currently generated.

Thus, through the main screen G3, the user can distinguishably recognize a tendency of generation of the equipment alarm and a tendency of generation of the maintenance alarm.

(Equipment Alarm Screen)

FIG. 21 is a diagram illustrating an equipment alarm screen G9 which, in this example, includes equipment alarms outputted throughout the production line 9.

In FIG. 21, the equipment alarm screen G9 includes a list G902. Each row of the list G902 includes a details button G903 and a related button G904.

Each row included in the list G902 represents an equipment alarm, and includes time and date of generation, an equipment name, a degree of urgency, and a tag name for which the equipment alarm was outputted. When the details button G903 has been operated, an equipment alarm details screen G11 (described later) is displayed for the corresponding equipment alarm. When the related button G904 has been operated, a manual file of the piece of equipment Mi is displayed as information related to an abnormality indicated by the corresponding equipment alarm. The manual file includes a remedy for cancelling occurrence of abnormality or a sign of abnormality indicated by the equipment alarm. As shown in (a) of FIG. 5, the manual file is a file registered in the configuration data of the production line 9 while being associated with the corresponding piece of equipment Mi.

Through the equipment alarm screen G9, the user can grasp a history of equipment alarms outputted throughout the production line 9. Moreover, the user can refer to the related manual file to deal with the equipment alarm that has been generated for the corresponding piece of equipment Mi.

(Maintenance Alarm Screen)

FIG. 22 is a diagram illustrating a maintenance alarm screen G10 which, in this example, includes maintenance alarms outputted throughout the production line 9.

In FIG. 22, the maintenance alarm screen G10 includes a list G1002. Each row of the list G1002 includes a details button G1003 and a component button G1004.

Each row included in the list G1002 represents a maintenance alarm, and includes time and date of generation, an equipment name, a component name, a degree of urgency, and a tag name for which the maintenance alarm was outputted. When the details button G1003 has been operated, a maintenance alarm details screen G12 (described later) is displayed for the corresponding maintenance alarm. When the component button G1004 has been operated, information is displayed which relates to a component that needs to be replaced or adjusted in maintenance prompted by the maintenance alarm. The information related to the component can include, for example, but not limited to, a manufacturer of the component, an item number, an item name, specifications, reference delivery days, an inventory quantity, and the like.

Through the maintenance alarm screen G10, the user can grasp a history of maintenance alarms generated throughout the production line 9. In addition, in order to carry out maintenance prompted by the maintenance alarm generated for the corresponding piece of equipment Mi, the user can refer to details of the component that needs to be replaced or adjusted.

Thus, by viewing the equipment alarm screen G9 and the maintenance alarm screen G10, the user can distinguishably recognize a tendency of generation of the equipment alarm and a tendency of generation of the maintenance alarm. This allows the user to determine, on the basis of the internal state and the external state of each piece of equipment Mi, whether it is necessary to carry out maintenance of the piece of equipment or it is necessary to deal with an abnormality or a sign of abnormality. In this example, the equipment alarm screen G9 can include a component button G1004 similar to that in the maintenance alarm screen G10. For example, there is a case where the motor needs to be replaced due to abnormal thermal trip of the motor. Thus, the component button G1004 can be displayed for an equipment alarm that may necessitate replacement or adjustment of a component to solve an abnormality.

(Equipment Alarm Details Screen)

FIG. 23 is a diagram illustrating an equipment alarm details screen G11 which, in this example, includes details of an equipment alarm outputted for the tag T11 for the piece of equipment M1.

In FIG. 23, the equipment alarm details screen G11 includes a graph of collected data for the tag 11 and lines indicating thresholds for respective degrees of urgency. Through the screen, the user can visually grasp a point in time at which a state of the piece of equipment M1 indicated by the collected data for the tag 11 exceeded the threshold, the number of times of such a case, and the like, for each degree of urgency of the equipment alarm.

(Maintenance Alarm Details Screen)

FIG. 24 is a diagram illustrating a maintenance alarm details screen G12 which, in this example, includes details of a maintenance alarm outputted for the tag T21 for the piece of equipment M1.

In FIG. 24, the maintenance alarm details screen G12 includes a graph of collected data for the tag 21 and lines indicating thresholds for respective degrees of urgency. Through the screen, the user can visually grasp a point in time at which a state of the piece of equipment M1 indicated by the collected data for the tag 21 exceeded the threshold, the number of times of such a case, and the like, for each degree of urgency of the maintenance alarm.

Effect of Embodiment 1

As described above, in Embodiment 1, the gateway 10 obtains (i) information indicative of the internal states from the controllers Pi and (ii) information indicative of the external states from the sensors Cj without using any of the n controllers Pi. As a result, Embodiment 1 brings about effects of freely increasing or decreasing the number of sensors Cj without rewriting the program of the controllers Pi and thus enhancing the degree of freedom to increase or decrease the number of sensors Cj.

In Embodiment 1, the gateway 10 combines the information indicative of the internal state with the information indicative of the external state and the combined information thus obtained is displayed for each piece of equipment Mi. Therefore, the user can integrally grasp the state of the piece of equipment Mi.

In Embodiment 1, the server 20 presents the tendency of generation of the equipment alarm and the tendency of generation of the maintenance alarm for each piece of equipment Mi such that the tendencies can be distinguishably recognized. This allows the user of the terminal 30 (such as a person in charge of maintenance or an on-site person in charge) to more appropriately determine, for each piece of equipment Mi, whether it is necessary to carry out maintenance or it is necessary to deal with an abnormality or a sign of abnormality.

In Embodiment 1, the rule types of the maintenance alarm and the equipment alarm can be selectively associated by the user with determination conditions for determining collected data of tags (i.e., states of the piece of equipment Mi). For example, in a case where the piece of equipment Mi is in a certain state, it may be desirable to carry out maintenance or it may be desirable to deal with an abnormality, depending on a status of the production line 9 or needs on site. Therefore, the user of the terminal 30 in accordance with Embodiment 1 can more appropriately determine, depending on a status of the production line 9 or needs on site, whether to carry out maintenance or to deal with an abnormality.

Modification Example

In Embodiment 1, the information processing system 1 can include a plurality of gateways 10_x (x=1, 2, . . . ) each of which is configured in a manner similar to the gateway 10. In this case, information indicative of the internal state and information indicative of the external state of each piece of equipment Mi are collected by any of the plurality of gateways 10_x. For example, like a case where the production line 9 is constituted by a plurality sub-lines, n pieces of equipment Mi can be distributed and installed in physically different areas (e.g., different floors) within the production facility 90. In this case, the gateways 10_x can be installed in the respective areas so that the gateway 10_x in each of the areas collects information indicative of the internal state and information indicative of the external state of the piece of equipment Mi in the corresponding area.

In Embodiment 1, the example has been described in which the gateway 10 and the server 20 are connected to each other by the WAN 1001. Embodiment 1 is not limited to this, and the gateway 10 and the server 20 can be connected to each other by one-to-one connection using a mobile phone network. This configuration can advantageously eliminate an installation cost for connecting the gateway 10 to the server 20 with the WAN 1001 or the like. Furthermore, the communication means between the gateway 10 and the server 20 is not limited to the above-described examples.

Moreover, in Embodiment 1, the information processing system 1 can further include an intermediary device. The intermediary device mediates communication between the gateway 10 and one of or some of or all of the n controllers Pi. For example, it is assumed that one or some of the n controllers Pi are compatible with any of protocols A and B serving as connection protocols and one or some of the other n controllers Pi are compatible with any of protocols C and D. Moreover, it is assumed that the gateway 10 are compatible with communication using the protocols A and B but are not compatible with communication using the protocols C and D. In such a case, by providing the intermediary device compatible with the communication using the protocols C and D, the degree of freedom in type of controllers Pi of manageable pieces of equipment Mi increases in the information processing system 1.

Further, in Embodiment 1, the server 20 can output information obtained by combining information indicative of the internal state and information indicative of the external state not only to the display but also to other types of the output device 320. In addition, the server 20 can output, in a distinguishably recognizable manner, tendencies of generation of the equipment alarm and the maintenance alarm not only to the display but also to other types of the output device 320. Other types of the output device 320 include a speaker, a printer, and the like. For example, the combined information can be printed on a paper medium by a printer. Moreover, the tendencies of generation can be distinguishably outputted by a speaker in different types of sounds.

Embodiment 2

The following description will discuss Embodiment 2 of the present invention in detail.

<Configuration of Information Processing System 2>

FIG. 25 is a block diagram illustrating a configuration of an information processing system 2 in accordance with Embodiment 2. In FIG. 25, the information processing system 2 includes N gateways 10_x (x=1 to N, N is an integer of 2 or more), and a server 20_1. The information processing system 2 is a system that manages pieces of equipment in each of M production lines 9_y (y=1 to M, M is an integer of 2 or more).

Each of the production lines 9_y is installed in any of N production facilities 90_x. It is possible to install a plurality of production lines 9-y in one production facility 90-x. In the example illustrated in FIG. 25, a production facility 90_1 includes production lines 9_1 and 9_2. A production facility 90_2 includes a production line 9_3. A production facility 90_N includes a production line 9_M. Each gateway 10_x is installed in a corresponding production facility 90_x. Each of the gateways 10_x is communicably connected to the server 20_1 via the WAN 1001.

Each of the gateways 10_x is configured in a manner similar to the gateway 10 in accordance with Embodiment 1.

The server 20_1 has the following configuration, in addition to a configuration similar to that of the server 20 in accordance with Embodiment 1. The server 20_1 combines and outputs, for each of the production facilities 90_x, information indicative of the internal state and information indicative of the external state. For a production facility 90_x containing a plurality of production lines 9_y, the server 20_1 can also combine and output, for each of the plurality of production lines 9_y, information indicative of the internal state and information indicative of the external state.

Therefore, the server 20_1 stores the configuration data shown in FIG. 5 for the production facilities 90_x and the production lines 9_y. Moreover, each of tag names used in the setting data described in FIGS. 7 and 8 is preferably uniquely determined in all the production facilities 90_1 through 90_N.

With such a configuration, the information processing system 2 operates in a manner similar to that of the information processing system 1 in accordance with Embodiment 1 described with reference to FIG. 6. Note, however, that there is a difference as follows: in Step S110 or Step S207 in the information processing system 2, screens as shown in FIGS. 11 through 16 are displayed for each of the production facilities 90_x and for each of the production lines 90_y.

As such, according to Embodiment 2, it is possible to collectively manage the plurality of production lines 90_y installed in the plurality of production facilities 90_x. Consequently, in a case where the same person in charge or the same organization manages the plurality of production lines 9_y in the plurality of production facilities 90_x, it is easy to grasp information necessary for maintenance.

Note that each of the modification examples described in Embodiment 1 can also be applied to Embodiment 2. Further, in Embodiment 2, the example has been described in which one gateway is installed in each of the plurality of production facilities. Embodiment 2 is not limited to this, and a plurality of gateways can be installed in at least one of the plurality of production facilities.

Aspects of the present invention can also be expressed as follows:

The information processing device in accordance with embodiments described above is an information processing system for managing one or more pieces of equipment in at least one production facility. The system includes: one gateway or a plurality of gateways; and a server communicably connected to the one gateway or each of the plurality of gateways. The one gateway or the each of the plurality of gateways is communicably connected to a controller included in each of the one or more pieces of equipment and is communicably connected, without being intermediated by the controller included in the each of the one or more pieces of equipment, to an externally attached sensor accompanying the each of the one or more pieces of equipment. The one gateway or the each of the plurality of gateways carries out the processes of: (i) receiving information obtained by the controller and indicative of an internal state of the each of the one or more pieces of equipment; (ii) receiving information obtained by the sensor and indicative of an external state of the each of the one or more pieces of equipment; and (iii) transmitting, to the server, the information indicative of the internal state and the information indicative of the external state. The server carries out the process of (iv) combining and outputting the information indicative of the internal state and the information indicative of the external state received from the one gateway or the each of the plurality of gateways.

An example of the configuration described above can be a mode in which a single gateway is installed in a single production facility. Another example can be a mode in which a plurality of gateways are installed in a single production facility.

According to the configuration, the externally attached sensor accompanying each piece of equipment is connected to the gateway without being intermediated by the controller. This enhances the degree of freedom to increase or decrease the number of externally attached sensors. As a result, a piece of equipment in a production facility can be managed with use of information from the piece of equipment and information from a sensor for measurement of a state of the piece of equipment, while achieving a high degree of freedom to increase and decrease the number of such sensors.

The information processing system in accordance with embodiments described above may be configured such that at least one of the plurality of gateways is installed in each of a plurality of production facilities. In this case, it is preferable that, in the process (iv), the server combine and output, for each of the plurality of production facilities, the information indicative of the internal state and the information indicative of the external state.

An example of the configuration described above can be a mode in which a single gateway is installed in each of a plurality of production facilities. Another example can be a mode in which a single gateway is installed in each of some of a plurality of production facilities and a plurality of gateways are provided in each of the others of the plurality of production facilities. Still another example can be a mode in which a plurality of gateways are installed in each of a plurality of production facilities.

According to the configuration above, it is possible to collectively manage pieces of equipment in the plurality of production facilities.

The information processing system in accordance with embodiments described above is preferably configured such that, in the process (iv), the server combines and outputs an alarm outputted on the basis of the information indicative of the internal state and an alarm outputted on the basis of the information indicative of the external state.

The information in which the alarms are combined can be, for example, the total number of (i) the number of outputs of an alarm based on the information indicative of the internal state and (ii) the number of outputs of an alarm based on the information indicative of the external state. According to the configuration, a user can integrally grasp the state of each piece of equipment by viewing the information in which the alarms are combined for the each piece of equipment.

The gateway in accordance with embodiments described above is communicably connected to a controller included in each of one or more pieces of equipment in a production facility and is communicably connected, without being intermediated by the controller included in the each of the one or more pieces of equipment, to an externally attached sensor accompanying the each of the one or more pieces of equipment. The gateway is further communicably connected to a server, and carries out the processes of: (i) receiving information obtained by the controller and indicative of an internal state of the each of the one or more pieces of equipment; (ii) receiving information obtained by the sensor and indicative of an external state of the each of the one or more pieces of equipment; and (iii) transmitting, to the server, the information indicative of the internal state and the information indicative of the external state.

The gateway in accordance with embodiments described above preferably includes: a communication interface which communicates with the controller; a communication interface which communicates with the sensor; a communication interface which communicates with the server; a processor which carries out the processes in accordance with a program; and a memory which stores the program.

According to the configuration, it is possible to realize a gateway in the information processing system described above.

A server in accordance with embodiments described above is communicably connected to a gateway, the gateway transmitting: information which is obtained from a controller included in each of one or more pieces of equipment in at least one production facility and which is indicative of an internal state of the each of the one or more pieces of equipment; and information which is obtained, without being intermediated by the controller included in the each of the one or more pieces of equipment, from an externally attached sensor accompanying the each of the one or more pieces of equipment and which is indicative of an external state of the each of the one or more pieces of equipment. The server carries out a process of combining and outputting the information indicative of the internal state and the information indicative of the external state received from the gateway.

The server in accordance with embodiments described above preferably includes: a communication interface which communicates with the gateway; a processor which carries out the processes in accordance with a program; and a memory which stores the program.

According to the configuration, it is possible to realize a server in the information processing system described above.

The information processing method in accordance with embodiments described above is a method for managing one or more pieces of equipment in at least one production facility. The gateway is communicably connected to a controller included in each of the one or more pieces of equipment and is communicably connected to an externally attached sensor accompanying the each of the one or more pieces of equipment. The information processing method includes the steps of: (i) receiving information obtained by the controller and indicative of an internal state of the each of the one or more pieces of equipment; (ii) receiving information obtained by the sensor accompanying and indicative of an external state of the each of the one or more pieces of equipment; and (iii) transmitting, to a server, the information indicative of the internal state and the information indicative of the external state. The server communicably connected to the gateway carries out the step of (iv)

combining and outputting the information indicative of the internal state and the information indicative of the external state received from the gateway Another information processing method in accordance with embodiments described above is an information processing method carried out by a gateway which is communicably connected to a controller included in each of one or more pieces of equipment in a production facility and is communicably connected, without being intermediated by the controller included in the each of the one or more pieces of equipment, to an externally attached sensor accompanying the each of the one or more pieces of equipment, the gateway being further communicably connected to a server. The information processing method includes the steps of: (i) receiving information obtained by the controller and indicative of an internal state of the each of the one or more pieces of equipment; (ii) receiving information measured by the sensor accompanying and indicative of an external state of the each of the one or more pieces of equipment; and (iii) transmitting, to a server, the information indicative of the internal state and the information indicative of the external state.

Another information processing method in accordance with embodiments described above is an information processing method carried out by a server. The information processing method includes the step of: receiving, via a gateway, (i) information which is obtained from a controller included in each of one or more pieces of equipment in at least one production facility and which is indicative of an internal state of the each of the one or more pieces of equipment and (ii) information which is obtained, without being intermediated by the controller, from an externally attached sensor accompanying the each of the one or more pieces of equipment and which is indicative of an external state of the each of the one or more pieces of equipment.

According to these methods, it is possible to bring about effects similar to those of the information processing system described above.

[Additional Remarks]

The present invention is not limited to the foregoing embodiments, but can be altered variously by a skilled person in the art within the scope of the claims. The present invention also encompasses, in its technical scope, any embodiment derived by appropriately combining technical means disclosed in the foregoing embodiments. Further, by combining technical means disclosed in different embodiments, it is possible to obtain a new technical feature.

REFERENCE SIGNS LIST 1, 2: Information processing system
10: Gateway
20: Server (information processing device)
30: Terminal
101, 201, 301: Processor
102, 202, 302: Main memory
103, 203, 303: Auxiliary memory
104, 105, 204, 304, 305: Communication interface
109, 209, 309: Bus
305: Input-output interface
310: Input device
320: Output device
1001: WAN
9: Production facility
9: Production line
9001: LAN
Mi: Piece of equipment
Pi: Controller
CP: Sensor base unit
Cj: Sensor

The invention claimed is:

1. An information processing system for managing one or more pieces of equipment in at least one production facility, comprising:
one gateway or a plurality of gateways; and
a server communicably connected to the one gateway or each of the plurality of gateways,
the one gateway or the each of the plurality of gateways being communicably connected to a controller included in each of the one or more pieces of equipment and being communicably connected, without being intermediated by the controller included in the each of the one or more pieces of equipment, to an externally attached sensor accompanying the each of the one or more pieces of equipment,
the one gateway or the each of the plurality of gateways being configured to carry out processes of,
receiving, from the server, collection setting data including information indicative of a kind of information to be collected and a time the information is to be collected,
in accordance with the collection setting data, transmitting, at the time indicated by the collection setting data, to each of the controllers, information specifying a device in which information obtained by the controller and indicative of an internal state of a corresponding pierce of equipment of the one or more pieces of equipment is stored,
receiving, from each of the controllers the information indicative of the internal state of the corresponding piece of equipment of the one or more pieces of equipment,
in accordance with the collection setting data, requesting, at timing indicated by the collection setting data, from a sensor base unit, information indicative of an external state of the each of the one or more pieces of equipment,
receiving, from the sensor base unit, the information indicative of the external state of the each of the one or more pieces of equipment, and
transmitting, to the server, the information indicative of the internal state of each of the one or more pieces of equipment and the information indicative of the external state of each of the one or more pieces of equipment, and the server being configured to carry out a process of,
combining and outputting the information indicative of the internal state of each of the one or more pieces of equipment and the information indicative of the external state of each of the one or more pieces of equipment received from the one gateway or the each of the plurality of gateways.

2. The information processing system as set forth in claim 1, wherein
at least one of the plurality of gateways is installed in each of a plurality of production facilities; and
in the process of the combining and the outputting, the server combines and outputs, for each of the plurality of production facilities, the information indicative of the internal state of each of the one or more pieces of equipment and the information indicative of the external state of each of the one or more pieces of equipment.

3. The information processing system as set forth in claim 1, wherein in the process of the combining and the outputting, the server combines and outputs a first alarm based on the information indicative of the internal state of each of the one or more pieces of equipment and a second alarm based on the information indicative of the external state of each of the one or more pieces of equipment.

4. A gateway which is communicably connected to a controller included in each of one or more pieces of equipment in a production facility and is communicably connected, without being intermediated by the controller included in the each of the one or more pieces of equipment, to an externally attached sensor accompanying the each of the one or more pieces of equipment, the gateway being further communicably connected to a server, the gateway being configured to carry out processes of,
receiving, from the server, collection setting data including information indicative of a kind of information to be collected and a time the information is to be collected,
in accordance with the collection setting data, transmitting, at the time indicated by the collection setting data, to each of the controllers, information specifying a device in which information obtained by the controller and indicative of an internal state of a corresponding piece of equipment of the one or more pieces of equipment is stored,
receiving, from each of the controllers, the information indicative of the internal state of the corresponding piece of equipment of the one or more pieces of equipment,
in accordance with the collection setting data, requesting, at timing indicated by the collection setting data, from a sensor base unit, information indicative of an external state of the each of the one or more pieces of equipment,
receiving, from the sensor base unit, the information indicative of the external state of the each of the one or more pieces of equipment, and
transmitting, to the server, the information indicative of the internal state of each of the one or more pieces of equipment and the information indicative of the external state of each of the one or more pieces of equipment.

5. The gateway as set forth in claim 4, comprising:
a communication interface which communicates with the controller;
a communication interface which communicates with the externally attached sensor;
a communication interface which communicates with the server;
a processor which carries out the processes in accordance with a program; and
a memory which stores the program.

6. An information processing method for managing one or more pieces of equipment in at least one production facility, the information processing method comprising:
receiving via a gateway communicably connected to a controller included in each of the one or more pieces of equipment and communicably connected to a sensor, from a server, collection setting data including information indicative of a kind of information to be collected and a time the information is to be collected;
in accordance with the collection setting data, transmitting via the gateway, at the time indicated by the collection setting data, to each of the controllers, information specifying a device in which information obtained by the controller and indicative of an internal state of a corresponding piece of equipment of the one or more pieces of equipment is stored;
receiving via the gateway, from each of the controllers, the information indicative of the internal state of the corresponding piece of equipment of the one or more pieces of equipment;
in accordance with the collection setting data, requesting via the gateway, at the time indicated by the collection setting data, from a sensor base unit, information indicative of an external state of the each of the one or more pieces of equipment;
receiving via the gateway, from the sensor base unit, the information indicative of the external state of the each of the one or more pieces of equipment;
transmitting, to the server via the gateway, the information indicative of the internal state of each of the one or more pieces of equipment and the information indicative of the external state of each of the one or more pieces of equipment; and
combining and outputting, via the server, the information indicative of the internal state of each of the one or more pieces of equipment and the information indicative of the external state of each of the one or more pieces of equipment received from the gateway.

* * * * *